United States Patent
Kojima et al.

(10) Patent No.: US 8,685,518 B2
(45) Date of Patent: Apr. 1, 2014

(54) INFORMATION RECORDING MEDIUM AND METHOD FOR PRODUCING SAME

(75) Inventors: Rie Kojima, Nara (JP); Akio Tsuchino, Osaka (JP); Hideo Kusada, Osaka (JP); Takashi Nishihara, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/699,871

(22) PCT Filed: Feb. 24, 2012

(86) PCT No.: PCT/JP2012/001302
§ 371 (c)(1),
(2), (4) Date: Nov. 26, 2012

(87) PCT Pub. No.: WO2012/120817
PCT Pub. Date: Sep. 13, 2012

(65) Prior Publication Data
US 2013/0071653 A1    Mar. 21, 2013

(30) Foreign Application Priority Data

Mar. 8, 2011 (JP) ............................. 2011-049902
Mar. 11, 2011 (JP) ............................. 2011-054205
Mar. 31, 2011 (JP) ............................. 2011-079694

(51) Int. Cl.
*G11B 7/24* (2013.01)

(52) U.S. Cl.
USPC .... 428/64.1; 428/64.4; 428/64.5; 430/270.13

(58) Field of Classification Search
USPC .............................................. 428/64.4, 64.5
See application file for complete search history.

(56) References Cited

U.S. PATENT DOCUMENTS

| | | | | |
|---|---|---|---|---|
| 6,416,837 | B1* | 7/2002 | Kojima et al. | 428/64.1 |
| 7,498,069 | B2 | 3/2009 | Ohkubo | |
| 7,709,073 | B2 | 5/2010 | Kojima et al. | |
| 2004/0076908 | A1 | 4/2004 | Oomachi et al. | |
| 2004/0105182 | A1 | 6/2004 | Nishihara et al. | |

(Continued)

FOREIGN PATENT DOCUMENTS

| | | |
|---|---|---|
| JP | 62-289937 | 12/1987 |
| JP | 63-225934 | 9/1988 |

(Continued)

OTHER PUBLICATIONS

International Search Report issued May 29, 2012 in International (PCT) Application No. PCT/JP2012/001301.

(Continued)

*Primary Examiner* — Elizabeth Mulvaney
(74) *Attorney, Agent, or Firm* — Wenderoth, Lind & Ponack, L.L.P.

(57) ABSTRACT

An information recording medium including three or more information layers, wherein: at least one information layer includes a recording layer and a nucleation layer; the recording layer contains a material that is represented by formula (1) $[(Ge_{0.5}Te_{0.5})_x(In_{0.4}Te_{0.6})_{1-x}]_y Sb_{100-y}$ (mol %) with x satisfying $0.8 \le x < 1.0$ and y satisfying $95 \le y < 100$; the nucleation layer contains a material that is represented by formula (2) $(Ge_{0.5}Te_{0.5})_z(Bi_{0.4}Te_{0.6})_{100-z}$ (mol %) with z satisfying $10 \le z \le 71$; and the nucleation layer is in contact with the recording layer. This information recording medium is capable of achieving sufficient signal amplitude even in cases where a small recording mark is formed, and is also capable of stably maintaining a small recording mark.

8 Claims, 1 Drawing Sheet

(56) References Cited

U.S. PATENT DOCUMENTS

| | | |
|---|---|---|
| 2004/0166440 A1 | 8/2004 | Tabata et al. |
| 2006/0083150 A1 | 4/2006 | Sakaue et al. |
| 2006/0126481 A1 | 6/2006 | Habuta et al. |
| 2009/0141615 A1 | 6/2009 | Nakai et al. |
| 2010/0046346 A1 | 2/2010 | Kusada et al. |
| 2010/0203280 A1 | 8/2010 | Ota et al. |
| 2010/0291337 A1 | 11/2010 | Suwabe et al. |
| 2011/0151277 A1 | 6/2011 | Nishihara et al. |
| 2011/0177280 A1 | 7/2011 | Tsuchino et al. |
| 2012/0263029 A1 | 10/2012 | Tajima et al. |

FOREIGN PATENT DOCUMENTS

| | | |
|---|---|---|
| JP | 63-225935 | 9/1988 |
| JP | 63-259855 | 10/1988 |
| JP | 1-303643 | 12/1989 |
| JP | 4-286733 | 10/1992 |
| JP | 2584741 | 2/1997 |
| JP | 2002-293025 | 10/2002 |
| JP | 2003-145944 | 5/2003 |
| JP | 2004-139690 | 5/2004 |
| JP | 2004-185731 | 7/2004 |
| JP | 2004-199786 | 7/2004 |
| JP | 2004-255698 | 9/2004 |
| JP | 2005-149616 | 6/2005 |
| JP | 2006-51803 | 2/2006 |
| JP | 2009-134833 | 6/2009 |
| JP | 4339356 | 10/2009 |
| JP | 2010-186516 | 8/2010 |
| JP | 2010-267359 | 11/2010 |
| WO | 03/025922 | 3/2003 |
| WO | 2004/034390 | 4/2004 |
| WO | 2009/096174 | 8/2009 |
| WO | 2010/095467 | 8/2010 |
| WO | 2011/007841 | 1/2011 |
| WO | 2011/024381 | 3/2011 |

OTHER PUBLICATIONS

International Search Report issued Jun. 5, 2012 in International (PCT) Application No. PCT/JP2012/001302.

U.S. Office Action issued Mar. 29, 2013 in U.S. Appl. No. 13/639,011.

* cited by examiner

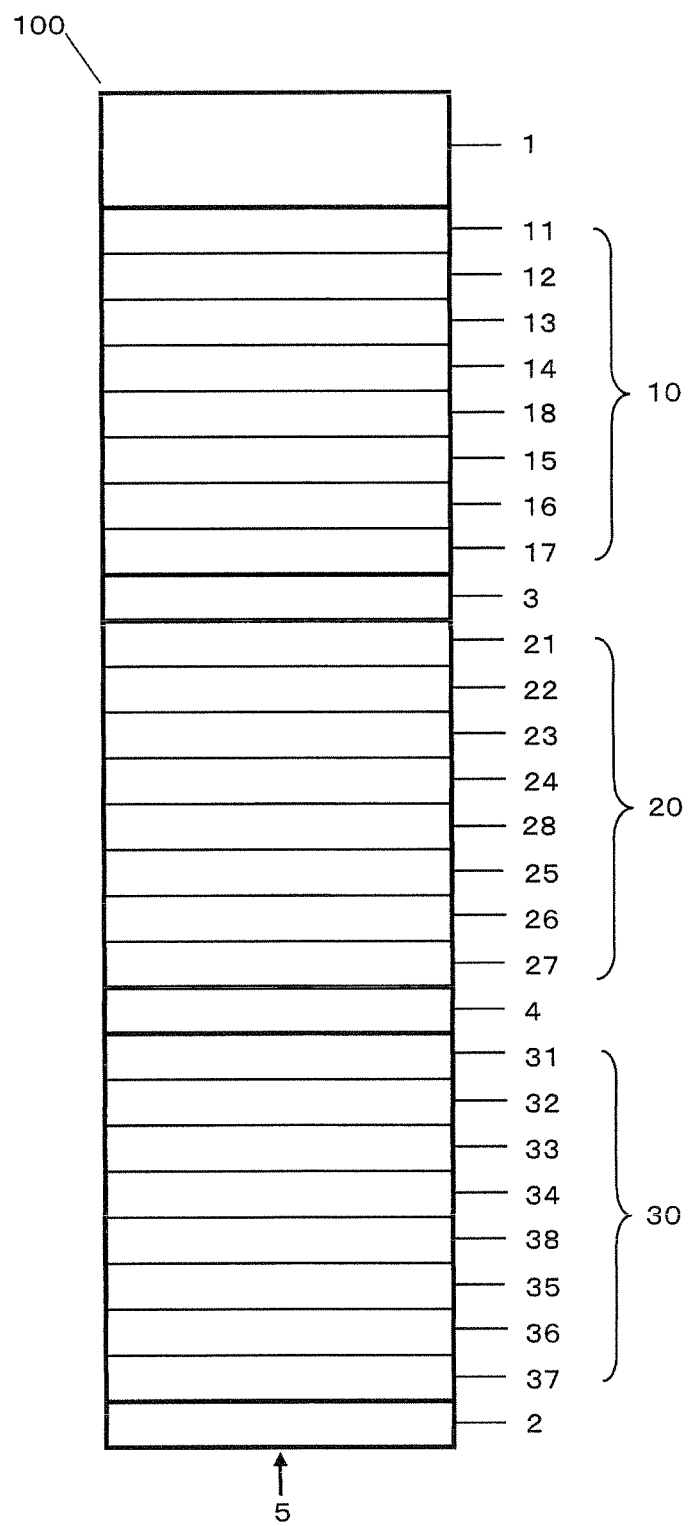

INFORMATION RECORDING MEDIUM AND METHOD FOR PRODUCING SAME

TECHNICAL FIELD

The present invention relates to an information recording medium which is capable of optically recording, erasing, rewriting and reproducing information.

BACKGROUND ART

The present inventors have developed a rewritable information recording medium for Blu-ray Disc (BD) (hereinafter referred to as BD-RE disc) which can be used as a recording medium for high-vision images. BD-RE disc is an information recording medium of large capacity, such that data of 25 giga bytes (GB) can be recorded in a single layer and data of 50 GB can be recorded in 2 layers. 1× speed of data transfer rate for BD-RE is determined by specifications as 36 mega bits per second (Mbps). The present inventors have developed GeTe—$Sb_2Te_3$-based material as a material for a recording layer in BD-RE for use in 1× speed (see, for example, Patent Literature 1).

Subsequently, the present inventors have developed GeTe—$Bi_2Te_3$-based material in which $Sb_2Te_3$ is replaced with $Bi_2Te_3$ since a recording layer in BD-RE disc compatible with 1-2× speed required higher crystallization-ability than that compatible with 1× speed (see, for example, Patent Literature 2 and Non-Patent literature 1).

CITATION LIST

Patent Literature

Patent Literature 1 JP 2584741 B2
Patent Literature 2 JP 4339356 B2

Non-Patent Literature

Non-Patent Literature 1 Panasonic Technical Journal, Vol. 54, No. 3, p. 151

SUMMARY OF INVENTION

Technical Problem

In recent years, BD recorders with built-in large-capacity hard disc and large-size televisions with built-in BD recorder have been released, and the spread of BD recorders and BD-RE discs has been accelerated. In such situation, next demand for BD-RE disc is to increasing capacity. Increasing capacity of BD-RE allows to record high-vision images over a long period of time, or it also allows BD-RE to be used as an interchangeable medium in place of hard disc.

A method for increasing capacity of BD-RE includes a method of increasing recording capacity per layer and a method of increasing the number of layers, and capacity can be increased further by combining the both methods. The present inventors have dealt with development of BD-RE disc with 100 GB by combining the both methods. Such BD-RE disc specifically has a form in which 3 information layers capable of recording data of 33.4 GB are laminated.

Increasing recording capacity from 25 GB to 33.4 GB means increasing recording density 1.34 times, and therefore, a mark itself to be recorded must be smaller. Accordingly, signal amplitude equal to or more than connectional one must be obtained from a small mark and the small mark must be stored stably when a recording capacity is increased. Increasing a ratio between a reflectance in an amorphous phase (recording mark) and a reflectance in a crystal phase (between the recording marks) of a recording layer is efficient in order to increase signal amplitude. To that end, it is preferable to use a phase change material having a large change in refractive index between the amorphous phase and the crystal phase as a material for the recording layer Further, use of a recording material with higher transition temperature into the crystal phase (crystallization temperature) is effective in storing the mark stably such that the amorphous phase is not easily changed into crystal phase.

In addition, increasing the number of layers from 2 to 3 means that a transmittance of an information layer (L2) located nearest to the light incident side (L2, L1, L0 being provided in this order from the light incident side) must be enhanced compared to a transmittance of an information layer (L1) located nearest to the light incident side in a two-layered BD-RE (L1, L0 being provided in this order from the light incident side). Two-layered BD-RE was optically designed such that the transmittance of L1 is about 50%; however, it is preferable to optically design three-layered. BD-RE such that the transmittance of L2 is about 56% and the transmittance of L1 is about 50%, for example.

A recording layer and a reflective layer which absorb light in L2 must be thinner than those in L1 of two-layered BD-RE. A ratio of the reflectance of the crystal phase to the reflectance of the amorphous phase is decreased when reducing a thickness of the recording layer. Therefore, phase change material with larger optical change is preferably used as a recording material in three-layered BD-RE similarly to the case in which the recording mark becomes smaller as described above. In addition, the amorphous phase is difficult to be formed when reducing the thickness of the reflective layer since the reflective layer is difficult to diffuse heat absorbed by the recording layer quickly in a thickness direction. On the other hand, the transmittance is decreased when increasing the thickness of the reflective layer. Therefore, it is necessary, in L2, to diffuse heat using a layer except for the reflective layer, which does not absorb light.

The present inventors has evaluated the recording and reproducing characteristics with respect to conventional GeTe—$Sb_2Te_3$-based material and GeTe—$Bi_2Te_3$-based material under conditions used upon recording and reproducing of 100 GB BD-RE having a three-layered structure. As a result, it has been found that GeTe—$Sb_2Te_3$-based material has a problem of lacking in stability of the recording mark and that GeTe—$Bi_2Te_3$-based material has problems of having a small optical change and of lacking in stability of the recording mark.

The present invention is to solve the above-mentioned conventional problems and aimed to provide a phase change recording material having large optical change and high crystallization temperature. A translucent information layer having sufficient reflectance ratio, sufficient signal amplitude from the recording mark, high transmittance and high reliability allowing the recording mark to be stored stably can be provided by combining a recording layer made of this recording material and other optical functional layer(s). Furthermore, the present invention is aimed at providing a multi-layered information recording medium having this translucent information layer.

Solution to Problem

In order to achieve the above-mentioned objects, the present invention provides an information recording medium including three or more information layers and being capable of recording and reproducing information by light, wherein at least one information layer includes a recording layer and a nucleation layer;

the recording layer contains a material represented by a following formula (1):

$$[(Ge_{0.5}Te_{0.5})_x(In_{0.4}Te_{0.6})_{1-x}]_y Sb_{100-y} \text{ (mol \%)} \quad (1)$$

(wherein x satisfies 0.8≤x<1.0 and y satisfies 95≤y<100); the nucleation layer contains a material represented by a following formula (2):

$$(Ge_{0.5}Te_{0.5})_z(Bi_{0.4}Te_{0.6})_{100-z} \text{(mol \%)} \quad (2)$$

(wherein z satisfies 10≤z≤71); and
the nucleation layer is in contact with the recording layer.

The recording layer and the nucleation layer containing materials represented by the above-mentioned formulas (1) and (2) respectively are preferably contained in the information layer provided on a light incident side. The information layer provided on the light incident side refers to an information layer which allows light to pass through it so that the light can reach an information layer provided on a reflective layer side compared to said information layer. Light which passes through the information layer provided on the light incident side enables recording and reproduction in the information layer provided on the reflective layer side. Such recording layer and nucleation layer may be contained in two or more information layers. Such recording layer and nucleation layer are more preferably contained in an information layer provided nearest to the light incident side, further more preferably contained in all information layers provided on the light incident side and most preferably contained in all information layers.

The present invention also provides an information recording medium including three or more information layers and being capable of recording and reproducing information by light, wherein at least one information layer includes a recording layer;

the recording layer contains Ge, Te, In, Bi and Sb; and an average crystal particle diameter of crystal particles constituting the recording layer is less than 100 nm.

The present invention also provides a method for manufacturing an information recording medium including three or more information layers and being capable of recording and reproducing information by light, which includes three or more steps of forming the information layer, wherein at least one step of forming the information layer includes a step of forming a recording layer and a step of forming a nucleation layer;

the step of forming the recording layer includes sputtering by use of a target containing Ge, In, Te and Sb so as to form a recording layer containing a material represented by a following formula (1):

$$[(Ge_{0.5}Te_{0.5})_x(In_{0.4}Te_{0.6})_{1-x}]_y Sb_{100-y} \text{ (mol \%)} \quad (1)$$

(wherein x satisfies 0.8≤x<1.0 and y satisfies 95≤y<100); the step of forming the nucleation layer includes sputtering by use of a target containing Ge, Bi and Te so as to form a nucleation layer containing a material represented by a following formula (2):

$$(Ge_{0.5}Te_{0.5})_z(Bi_{0.4}Te_{0.6})_{100-z} \text{(mol \%)} \quad (2)$$

(wherein z satisfies 10≤z≤71); and
the step of forming the nucleation layer is carried out just before or just after the step of forming the recording layer, or just before and just after the step of forming the recording layer.

Advantageous Effects of Invention

According to the information recording medium and the method for manufacturing the same of the present invention, a multi-layered rewritable information recording medium having a capacity of, for example, 33.4 GB or more per one layer can be achieved. This can achieve a large capacity information recording medium of 100 GB or more.

BRIEF DESCRIPTION OF DRAWING

FIG. 1 is a partial cross-sectional view showing an example of an information recording medium of the present invention.

DESCRIPTION OF EMBODIMENTS OF THE INVENTION

An information recording medium of the present invention is an information recording medium (hereinafter also referred to as either "recording medium" or "medium") including three or more information layers and being capable of recording and reproducing information by light, which is characterized in that at least one information layer includes a recording layer and a nucleation layer;

the recording layer contains a material represented by a following formula (1):

$$[(Ge_{0.5}Te_{0.5})_x(In_{0.4}Te_{0.6})_{1-x}]_y Sb_{100-y} \text{ (mol \%)} \quad (1)$$

(wherein x satisfies 0.8≤x<1.0 and y satisfies 95≤y<100); the nucleation layer contains a material represented by a following formula (2):

$$(Ge_{0.5}Te_{0.5})_z(Bi_{0.4}Te_{0.6})_{100-z} \text{ (mol \%)} \quad (2)$$

(wherein z satisfies 10≤z≤71); and
the nucleation layer is in contact with the recording layer.

In the information recording medium of the present invention, the nucleation layer may have a thickness of 0.1 nm or more and 2.0 nm or less. In addition, the recording layer may have a thickness of 3 nm or more and 10 nm or less.

A method for manufacturing an information recording medium of the present invention is a method for manufacturing an information recording medium including three or more information layers and being capable of recording and reproducing information by light, which includes three or more steps of forming the information layer, wherein at least one step of forming the information layer includes a step of forming a recording layer and a step of forming a nucleation layer;

the step of forming the recording layer includes sputtering by use of a target containing Ge, In, Te and Sb so as to form a recording layer containing a material represented by a following formula (1):

$$[(Ge_{0.5}Te_{0.5})_x(In_{0.4}Te_{0.6})_{1-x}]_y Sb_{100-y} \text{ (mol \%)} \quad (1)$$

(wherein x satisfies 0.8≤x<1.0 and y satisfies 95≤y<100); and the step of forming the nucleation layer includes sputtering by use of a target containing Ge, Bi and Te so as to form a nucleation layer containing a material represented by a following formula (2):

$$(Ge_{0.5}Te_{0.5})_z(Bi_{0.4}Te_{0.6})_{100-z} \text{ (mol \%)} \quad (2)$$

(wherein z satisfies 10≤z≤71); and
the step of forming the nucleation layer is carried out just before or just after the step of forming the recording layer, or just before and just after the step of forming the recording layer.

Embodiments of the present invention are described below with reference to the drawing.

(Embodiment 1)

An example of an information recording medium is described as Embodiment 1 of the present invention. FIG. 1 shows a partial cross-section of the information recording medium 100. In the information recording medium 100, a first information layer 10, an intermediate layer 3, a second information layer 20, an intermediate layer 4, a third information layer 30 and a transparent layer 2 formed on a substrate 1 are provided in this order.

The first information layer 10 is formed by providing a dielectric layer 11, a reflective layer 12, a dielectric layer 13, an interface layer 14, a nucleation layer 18, a recording layer 15, an interface layer 16 and a dielectric layer 17 in this order on one surface of the substrate 1.

The second information layer 20 is formed by providing a dielectric layer 21, a reflective layer 22, a dielectric layer 23, an interface layer 24, a nucleation layer 28, a recording layer 25, an interface layer 26 and a dielectric layer 27 in this order on one surface of the intermediate layer 3.

The third information layer 30 is formed by providing a dielectric layer 31, a reflective layer 32, a dielectric layer 33, an interface layer 34, a nucleation layer 38, a recording layer 35, an interface layer 36 and a dielectric layer 37 in this order on one surface of the intermediate layer 4.

Information is recorded on and reproduced from the information recording medium 100 with bluish-violet laser beam 5 having a wavelength of about 405 nm. The laser beam 5 enters from the transparent layer 2 side. Recording and reproduction of information in the first information layer 10 is carried out with the laser beam 5 passing through the third information layer 30 and the second information layer 20, and recording and reproduction in the second information layer 20 is carried out with the laser beam 5 passing through the third information layer 30.

Since information can be recorded on and/or reproduced from the three information layers in the information recording medium 100, an information recording medium having, for example, a capacity of 100 GB can be obtained wherein the capacity per one information layer is 33.4 GB.

An effective reflectance of each of three information layers can be controlled by adjusting the reflectance of each of the first, second and third information layers and the transmittance of each of the second and third information layers, respectively.

In the present specification, the reflectance of each information layer which is measured in the state where three information layers are stacked is determined as the effective reflectance. A reflectance without indicating "effective" means a reflectance measured without stacking the information layers, unless otherwise noted. In addition, Rcg is a groove-portion reflectance of an information layer when the recording layer is in crystal phase and Rag is a groove-portion reflectance of an information layer when the recording layer is in amorphous phase. Here, "groove portion" refers to a portion where a guide groove (which is described below) is formed in the substrate and the "groove-portion reflectance" is a reflectance of the information layer located above a part having the groove portion. A "reflectance ratio" is defined as Rcg/Rag. A "reflectance contrast" is defined as (Rcg−Rag)/(Rcg+Rag). Here, assuming that Rc is a mirror-portion reflectance of the information layer when the recording layer is in crystal phase and Ra is a mirror-portion reflectance of the information layer when the recording layer is in amorphous phase, Rc is 1.2 to 1.4 times Rcg, and Ra is 1.2 to 1.4 times Rag. Here, the "mirror portion" refers to a portion of the substrate where the guide groove is not formed (a flat portion).

In this embodiment, a configuration designed such that the first information layer 10 has the effective Rcg of 1.8% and the effective Rag of 0.2%, the second information layer 20 has the effective Rcg of 1.7% and the effective Rag of 0.2% and the third information layer 30 has the effective Rcg of 2.6% and the effective Rag of 0.4%, is described as an example.

When the third information layer 30 has the transmittance [(Tc+Ta)/2] of 56% and the second information layer 20 has the transmittance of 50%, the first information layer 10 can be designed to have Rcg of 23% and Rag of 3%, the second information layer 20 can be designed to have Rcg of 5.5% and Rag of 0.7% and the third information layer 30 can be designed to have Rcg of 2.6% and Rag of 0.4%. Here, Tc is a transmittance of the information layer when the recording layer is in crystal phase, and Ta is a transmittance of the information layer when the recording layer is in amorphous phase. As an example, when [(Tc+Ta)/2] of the third information layer 30 is 56%, Tc may be 55% and Ta may be 57%. Alternatively, Tc may be 57% and Ta may be 55%. Although Tc and Ta may not be the same, they are preferably close in value.

The functions, materials and thicknesses of the substrate 1, the intermediate layer 3, the intermediate layer 4 and the transparent layer 2 are described below. The substrate 1 has functions mainly as a support, and a disc-shaped transparent substrate having flat surface is used as the substrate 1. The material for the substrate 1 includes resin such as polycarbonate, amorphous polyolefin and polymethyl methacrylate (PMMA), and glass. Considering the formability, price and mechanical strength, polycarbonate is preferably used. In the embodiment illustrated in the drawing, the substrate 1 having a thickness of about 1.1 mm and a diameter of about 120 mm is preferably used.

A concavo-convex guide groove for guiding laser beam 5 may be formed in a surface of the substrate 1 on which the information layer 10 is formed. When the guide groove is formed in the substrate 1, in the present specification, the surface which is on the side close to the laser beam 5 is called "groove surface" for convenience, and the surface which is on the side far from the laser beam 5 is called a "land surface" for convenience. When used as a Blu-ray Disc (BD), for example, a difference in level between the groove surface and the land surface is preferably 10 nm or more and 30 nm or less. In BD, the recording is carried out only on the groove surface. In the substrate 1 for BD, a distance between grooves (a distance from a center of a groove surface to a center of another groove surface) is preferably about 0.32 μm.

The intermediate layer 3 has function to separate a focal position of laser beam 5 in the second information layer 20 from a focal position of laser beam 5 in the first information layer 10. Guide groove for the second information layer 20 may be optionally formed in the intermediate layer 3. Similarly, the intermediate layer 4 has a function to separate a focal position of laser beam 5 in the third information layer 30 from the focal position of laser beam 5 in the second information layer 20. Guide groove for the third information layer 30 may be optionally formed on the intermediate layer 4. The intermediate layers 3 and 4 can be formed of an ultraviolet-curing resin. Also, the intermediate layers 3 and 4 may be optionally configured by laminating a plurality of resin layers. For example, the intermediate layer 3 may consist of two or more layers including a layer to protect the dielectric layer 17 and a layer having the guide groove.

It is desirable that the intermediate layers 3 and 4 are transparent to a light having a wavelength λ for recording and reproduction such that the laser beam 5 efficiently reaches the first information layer 10 and the second information layer 20. The thicknesses of the intermediate layers 3 and 4 are preferably selected so as to satisfy requirements below;

i) each of the thicknesses of the intermediate layers 3 and 4 is equal to or more than a focal depth determined by a numerical aperture of an objective lens and the wavelength of the laser beam;

ii) the distance between the recording layer 15 and the recording layer 35 is within a range in which the objective lens can collect light;

iii) the total of the thicknesses of the intermediate layers 3 and 4 and the thickness of the transparent layer 2 is within a tolerance of the substrate thickness which is acceptable to the objective lens used.

The distance from the surface of the transparent layer 2 to the recording layer 15 of the first information layer 10 is preferably 95 µm or more and 105 µm or less. Further, the thicknesses of the intermediate layers 3 and 4 are preferably different from each other such that the reproduction of signals from the first, second and third information layers and the recording, erasing and rewriting of signals in these information layers are carried out successfully without adversely affected by one another. The thicknesses of the respective intermediate layers are preferably selected within a range of 10 µm or more and 30 µm or less. For example, the thicknesses of the intermediate layer 3, the intermediate layer 4 and the transparent layer 2 may be set such that the distance from the surface of the transparent layer 2 to the recording layer 15 is 100 µm. Specifically, the thickness of the intermediate layer 3 may be 25 µm, the thickness of the intermediate layer 4 may be 18 µm and the thickness of the transparent layer 2 may be 57 µm, for example.

The transparent layer 2 is described. As a method for increasing a recording density of the information recording medium, there is a method in which the numerical aperture NA of the objective lens is increased so as to narrow laser beam using short-wavelength laser beam. In this case, the transparent layer 2 located on the side on which the laser beam 5 enters is designed to be thinner compared to the substrate 1 since the focal position becomes shallow. According to this configuration, large capacity information recording medium 100 capable of recording with higher density can be obtained.

As the transparent layer 2, a layer which is disc-shaped and transparent and has a flat surface is used as is the case with the substrate 1. The transparent layer 2 may consist of, for example, a disc-shaped sheet and an adhesive layer, or may be formed of ultraviolet-curing resin. Concavo-convex guide groove for guiding laser beam 5 may be optionally formed in the transparent layer 2. Also, protective layer (not shown) may be provided on a surface of the dielectric layer 37, and the transparent layer 2 may be provided on the protective layer. Total thickness (for example, the sheet thickness+the adhesive layer thickness+the protective layer thickness, or the thickness of only the ultraviolet-curing resin) is preferably 50 µm or more and 65 µm or less in any embodiments. The sheet is preferably formed of resin such as polycarbonate, amorphous polyolefin or PMMA, and especially preferably polycarbonate. In addition, the transparent layer 2 preferably has a low birefringence in short wavelength area in optical viewpoint since it is located on the laser beam 5 incident side.

Next, the respective information layers are described. First, the configuration of the third information layer 30 is described.

The third information layer 30 is formed by providing the dielectric layer 31, the reflective layer 32, the dielectric layer 33, the interface layer 34, the nucleation layer 38, the recording layer 35, the interface layer 36 and the dielectric layer 37 in this order on one surface of the intermediate layer 4 as described above.

The third information layer 30 is an information layer provided nearest to the side on which laser beam 5 enters (specifically, the surface of the transparent layer 2). Therefore, the third information layer 30 is designed to exhibit high transmittance such that laser beam 5 can reach the first information layer 10 and the second information layer 20. Specifically, assuming that Tc (%) is a light transmittance of the third information layer 30 when the recording layer 35 is in crystal phase and that Ta (%) is a light transmittance of the third information layer 30 when the recording layer 35 is in amorphous phase, they preferably satisfy 53%≤(Ta+Tc)/2, and more preferably 56%≤(Ta+Tc)/2.

The information recording medium of the present invention is characterized in that, in at least one information layer, the recording layer is a layer containing specific material and the nucleation layer is provided. In the information recording medium illustrated in the drawing, the third information layer 30 includes such recording layer 35 and nucleation layer 38. Accordingly, the recording layer 35 and the nucleation layer 38 are firstly described.

The recording layer 35 causes reversible phase change between amorphous phase and crystal phase by absorbing laser beam 5, whereby, functions of recording, erasing and rewriting information given to the information layer 30. In addition, information is reproduced from the information layer 30 by use of the reflectance ratio (or the difference in reflectance) between amorphous phase and crystal phase.

The recording layer 35 contains Ge, In, Te and Sb, and specifically contains a material represented by a following formula (1):

$$[(Ge_{0.5}Te_{0.5})_x(In_{0.4}Te_{0.6})_{1-x}]_y Sb_{100-y} \text{ (mol \%)} \tag{1}$$

(wherein x satisfies 0.8≤x<1.0 and y satisfies 95≤y<100). This material is an excellent recording material having large optical change and high crystallization temperature due to inclusion of $Ge_{0.5}Te_{0.5}$, $In_{0.4}Te_{0.6}$ and Sb.

Here, the unit of the composition of the recording layer is mol % unless otherwise noted. Similarly, the unit of composition of the dielectric layer, the reflective layer, the interface layer and the nucleation layer is also mol % unless otherwise noted. Hereinafter, "mol %" is omitted.

The material represented by $(Ge_{0.5}Te_{0.5})_x(In_{0.4}Te_{0.6})_{1-x}$ is a material having higher crystallization temperature compared to GeTe—$Sb_2Te_3$-based material and GeTe—$Bi_2Te_3$-based material which have been used conventionally. Therefore, the recording mark which is in amorphous phase can be stored stably by using this material for the recording layer 35.

In addition, the composition containing more ($Ge_{0.5}Te_{0.5}$) exhibits larger optical change. Here, "optical change" refers to a difference between complex refractive index in crystal phase (nc-ikc) and complex refractive index in amorphous phase (na-ika), that is, |Δn|+|Δk|. nc is a refractive index in crystal phase, kc is an extinction coefficient in crystal phase, na is a refractive index in amorphous phase, ka is an extinction coefficient in amorphous phase, Δn=nc−na and Δk=kc−ka. nc, kc, na and ka depend on a wavelength of light, and the shorter wavelength is, the lower |Δn|+|Δk| is when the same composition is used.

For example, when designing an information recording medium in which recording and reproduction are carried out by bluish-violet laser having a wavelength of 405 nm (i.e. BD), x is preferably selected to satisfy 0.8≤x<1.0, and more preferably 0.85≤x≤0.95 in the formula (1). When x is less than 0.8, optical change for bluish-violet laser is lacking, and sufficient reflectance ratio cannot be obtained especially when data corresponding to a capacity of 33.4 GB is recorded on L2 so that sufficient signal amplitude cannot be obtained. x<1.0 is preferable since the crystallization speed (a relative rate upon transferring from amorphous phase to crystal phase) is decreased and the repeated overwriting characteristics is also decreased when the recording layer is formed only of $(Ge_{0.5}Te_{0.5})$.

A small amount of Sb has functions of increasing a crystallization temperature without decreasing a crystallization speed and of increasing an optical change. A concentration of added Sb, that is, (100-y) in the formula (1) $[(Ge_{0.5}Te_{0.5})_x(In_{0.4}Te_{0.6})_{1-x}]_ySb_{100-y}$ is preferably 5 mol % or less, and more preferably 3 mol % or less. When the concentration of added Sb is more than 5 mol %, the crystallization speed is decreased, and thus, an erasing performance of the information layer becomes insufficient when the data transfer rate is, for example, 2×-speed (72 Mbps).

The crystal structure of the material represented by the above-mentioned formula (1) is rock salt structure. Therefore, the crystal structure of the recording layer 35 is also rock salt structure.

The thickness of the recording layer 35 is preferably 3 nm or more and 10 nm or less. When the thickness exceeds 10 nm, the light transmittance of the third information layer 30 decreases; when the thickness is less than 3 nm, the reflectance ratio of the third information layer 30 is reduced so that the sufficient signal amplitude becomes difficult to be obtained. More preferable thickness of the recording layer 35 is 5 nm or more and 7 nm or less. The thickness of the recording layer 35 is designed to be thinner than that of the recording layer 25 since the light transmittance of the third information layer 30 is required to be higher than that of the second information layer 20.

Preferably, the recording layer 35 substantially consists of the material represented by the above-mentioned formula (1). In other words, it is preferable that the recording layer 35 substantially consists of Ge, Te, In and Sb and that the composition of the recording layer 35 is represented by the above-mentioned (1). The composition of the recording layer 35 can be analyzed by, for example, high-frequency inductively-coupled plasma (IPC) emission spectroscopic analysis, X-ray microanalyzer (XMA) or electron probe microanalyzer (EPMA). Here, a term "substantially consist of" is used in consideration of the facts that the recording layer 35 formed by sputtering, for example, inevitably contains components coming from rare gases which are present in a sputtering atmosphere (Ar, Kr, Xe), components coming from moisture (O—H), components coming from organic substances (C), components coming from air (N, O), components of jigs provided in a sputtering room (metals), impurities contained in a target (metals, semi-metals, semiconductors, dielectric) and the like and that these components may be detected by analyses such as IPC emission spectroscopic analysis, XMA or EPMA. These inevitable components may be contained in an amount of up to 10 atomic %, assuming that the total of atoms contained in the recording layer 35 is 100 atomic %. This also applies similarly to the recording layers 25 and 15 described below.

When the material represented by the formula (1) is indicated with atomic %, for example in case of x=0.8 and y=99.5, it is represented as $Ge_{39.8}In_{8.0}Te_{51.7}Sb_{0.5}$ (atomic %). Or, in case of x=0.9 and y=97.0, the material is represented as $Ge_{43.5}In_{4.0}Te_{49.5}Sb_{3.0}$ (atomic %). Or, in case of x=0.95 and y=95.0, the material is represented as $Ge_{45.2}In_{1.8}Te_{48.0}Sb_{5.0}$ (atomic %).

Tolerable composition range of each element is described. The ratios of the respective elements may be deviated depending on a sputtering apparatus used in the step of forming the recording layer 35 even if the composition of the recording layer 35 is represented by $[(Ge_{0.5}Te_{0.5})_x(In_{0.4}Te_{0.6})_{1-x}]_ySb_{100-y}$. In addition, for example in IPC emission spectroscopic analysis, analytical errors also occur. Therefore, when the composition of the recording layer 35 is actually analyzed, deviations from the represented composition may occur within a range of ±2.0 atomic % for Ge, ±0.5 atomic % for In, ±2.0 atomic % for Te and ±0.3 atomic for Sb. The deviations within these ranges are tolerable. Furthermore, the deviations in the composition are more preferably within a range of ±1.0 atomic % for Ge, ±0.3 atomic % for In, ±1.0 atomic % for Te and ±0.2 atomic % for Sb. For example, the above-mentioned material with x=0.9 and y=97.0 shall cover the material of $Ge_{43.5\pm2.0}In_{4.0\pm0.5}Te_{49.5\pm2.0}Sb_{3.0\pm0.3}$ (atomic %), and preferably covers the material of $Ge_{43.5\pm1.0}In_{4.0\pm0.3}Te_{49.5\pm1.0}Sb_{3.0\pm0.2}$ (atomic %). This also applies similarly to the recording layers 25 and 15 described below.

Next, the nucleation layer 38 is described. The nucleation layer 38 contains Ge, Bi and Te, and specifically contains a material represented by a following formula (2):

$$(Ge_{0.5}Te_{0.5})_z(Bi_{0.4}Te_{0.6})_{100-z} \qquad (2)$$

(wherein z satisfies 10≤z≤71). $(Bi_{0.4}Te_{0.6})$ is a material having quite high crystallinity, which has a crystallization temperature of thin film equal to or less than room temperature and is in a crystal form at room temperature. The crystal system becomes rock salt structure by adding $(Ge_{0.5}Te_{0.5})$ to $(Bi_{0.4}Te_{0.6})$, and minute crystal cores are generated in, for example, an ultrathin film of $(Ge_{0.5}Te_{0.5})_z(Bi_{0.4}Te_{0.6})_{100-z}$ formed by sputtering.

The nucleation layer 38 functions to reduce the crystal particle diameter of the recording layer 35 when the recording layer 35 and the nucleation layer 38 are provided in this order from the light incident side and by the nucleation layer 38 is in contact with the recording layer 35. The material represented by the above formula (1) is a excellent material which has high crystallization temperature and large optical change, and can achieve a recording layer 35 having small crystal particle diameter by being combined with the nucleation layer 38. The smaller the crystal particle diameter of the recording layer 35 is, the lower the noise in the reproduced signal is, and therefore, the quality of the recoded signal in the third information layer 30 is improved. As to the crystal particle diameter in the recording layer 35, the average crystal particle diameter determined by the following method is preferably less than 100 nm and more preferably less than 50 nm. The average crystal particle diameter is determined by the following procedure.

(Method for Determining the Average Crystal Particle Diameter)

Cross section of a thin film of the information recording medium 100 is cut out, and the cross section is sliced into a thin piece by focused ion beam (FIB) method.

The cross section is observed by transmission electron microscope (TEM), and diameters of approximately 10 crystal particles in the recording layer 35 are measured from the observed image. The measurement is carried out by distinguishing boundary of a crystal particle by contrasting density of the observed image, and then measuring the diameter of the particle of which boundary is determined (length of the longest line segment among the line segments connecting arbitrary two points on the boundary).

An average is calculated from the measured values.

As described above, crystal particles constituting the recording layer 35 is reduced due to contact of the recording layer 35 with the nucleation layer 38. For this reason, the recording layer 35 may be specified as a layer containing Ge, Te, In and Sb, as well as Bi which is entered from the nucleation layer 38, in which average diameter of the crystal particles constituting the layer is less than 100 nm.

In FIG. 1, the nucleation layer 38 is located between the interface layer 34 and the recording layer 35. In another embodiment, the nucleation layer and the recording layer may be provided in this order from the light incident side with the nucleation layer located between the interface layer 36 and the recording layer. In a further embodiment, the nucleation layers may be provided so as to be located on both sides of the recording layer.

In the above-mentioned formula (2), when the percentage of $(Ge_{0.5}Te_{0.5})$ is less than 10 mol % (in other words, when z is less than 10), the crystal structure becomes rhombohedral crystal so that the diameter of the crystal particle in the recording layer 35 having rock salt structure cannot be decreased, and when the percentage is more than 71 mol %, nucleation performance in a state of ultrathin film is decreased. The nucleation performance of the nucleation layer 38 is essentially determined by the value of z in the composition and the thickness. The larger the nucleation performance of the nucleation layer 38 is, the smaller diameters of the crystal particles in the recording layer 35 can be. A material with a composition having small z and much $(Bi_{0.4}Te_{0.6})$ has relatively high crystallinity, and a material with a composition having large z and less $(Bi_{0.4}Te_{0.6})$ has relatively low crystallinity. Therefore, when a given nucleation performance is to be obtained, the thickness of the nucleation layer 38 can be thinner with smaller z. When z is fixed in the formula (2), nucleation performance can be controlled by adjusting the thickness of the nucleation layer 38.

The thickness of the nucleation layer 38 is set to sufficient one to fulfill the function of decreasing the diameters of the crystal particles in the recording layer 35. Specifically, the thickness of the nucleation layer 38 is preferably 0.1 nm or more and 2.0 nm or less, and more preferably 0.5 nm or more and 1.0 nm or less. When the thickness within the range is selected, z in the formula (2) (in other words, the concentration of $(Ge_{0.5}Te_{0.5})$) is more preferably 20 or more and 62 or less.

Preferably, the nucleation layer 38 substantially consists of the material represented by the above-mentioned formula (2). In other words, it is preferable that the nucleation layer 38 substantially consists of Ge, Te and Bi and that the composition of the nucleation layer 38 is represented by the above-mentioned formula (2). The composition of the nucleation layer 38 can be analyzed by, for example, ICP emission spectroscopic analysis, XMA, EPMA. Here, a term "substantially consists of" is used in consideration of the facts that the nucleation layer 38 formed by sputtering, for example, inevitably contains rare gases which are present in a sputtering atmosphere (Ar, Kr, Xe), moisture (O—H), organic substances (C), air (N, O), components of jigs provided in the sputtering room (metals), impurities contained in a target (metals, semi-metals, semiconductors, dielectric) and the like and that these components may be detected by analyses such as IPC emission spectroscopic analysis, XMA, EPMA or the like. These inevitable components may be contained in an amount of up to 10 atomic %, assuming that the total of atoms contained in the nucleation layer 38 is 100 atomic %. This also applies similarly to the nucleation layers 28 and 18 described below.

When the material represented by the formula (2) is indicated with atomic %, for example, in case of z=10, it is represented by $Ge_{5.0}Bi_{36.0}Te_{59.0}$. Or, in case of z=71, it is represented by $Ge_{35.5}Bi_{11.6}Te_{52.9}$.

Tolerable composition range of each element is described. The ratio of each element may be deviated depending on a sputtering apparatus used in the step of forming the nucleation layer 38 even if the composition of the nucleation layer 38 is represented by $[(Ge_{0.5}Te_{0.5})_z(Bi_{0.4}Te_{0.6})_{100-z}]$. In addition, for example in ICP emission spectroscopic analysis, analytical errors also occur. Therefore, when the composition of the nucleation layer 38 is actually analyzed, deviations from the represented composition may occur within a range of ±2.0 atomic % for Ge, ±2.0 atomic % for Bi and ±2.0 atomic % for Te. The deviations within these ranges are tolerable. Furthermore, the deviations in the composition are more preferably within a range of ±1.0 atomic % for Ge, ±1.0 atomic % for Bi and ±1.0 atomic % for Te. For example, the above-mentioned material with z=10 shall cover the material with $Ge_{5.0\pm2.0}Bi_{36.0\pm2.0}Te_{59.0\pm2.0}$ (atomic %), and preferably cover the material with $Ge_{5.0\pm1.0}Bi_{36.0\pm1.0}Te_{59.0\pm1.0}$ (atomic %). This also applies similarly to the nucleation layers 28 and 18 described below.

Next, the dielectric layer 31 is described. The dielectric layer 31 has a function of enhancing light transmittance of the third information layer 30. The material is preferably transparent and has refractive index of 2.4 or more for laser beam 5 having wavelength of 405 nm. When the refractive index of the dielectric layer 31 is decreased, the reflectance ratio Rcg/Rag of the third information layer 30 is increased; however, on the other hand, the light transmittance is decreased. As a refractive index which gives the reflectance ratio of 4 or more and the light transmittance of 53% or more, a refractive index of 2.4 or more is preferable. Therefore, when the refractive index is less than 2.4, the light transmittance of the third information layer 30 is decreased so that the sufficient laser beam 5 may not reach the first information layer 10 and the second information layer 20.

As a material for the dielectric layer 31, $Bi_2O_3$, $Bi_2O_3$—$TiO_2$ or $TiO_2$ may be used. $Bi_2O_3$ has refractive index of about 2.7. A complex oxide of $Bi_2O_3$ and $TiO_2$ is preferably used as a material for the dielectric layer 31 since $TiO_2$ has the refractive index of about 2.6 and also excellent humidity resistance. The complex oxide of $Bi_2O_3$ and $TiO_2$ has a crystallization temperature higher than those of simple $Bi_2O_3$ and simple $TiO_2$, and its structure is stable against heat.

According to optical calculation, when the thickness of the dielectric layer 31 is $\lambda/(8n_1)$ (nm) ($\lambda$ is a wavelength of laser beam 5, $n_1$ is refractive index of the dielectric layer 31) or close to $\lambda/(8n_1)$, the transmittance of the third information layer 30 reaches a maximum value. The reflectance contrast (Rcg−Rag)/(Rcg+Rag) reaches a maximum value when the thickness of the dielectric layer 31 is $\lambda/(16n_1)$ or more and $\lambda/(4n_1)$ or less. Therefore, the thickness of the nucleation layer 31 can be selected such that both of the transmittance and the reflectance contrast is increased. Specifically, it is preferably 9 nm or more and 30 nm or less.

The reflective layer 32 has optical functions of increasing the light intensity absorbed by the recording layer 35 and of increasing the difference in the reflectance of the third information layer 30 between when the recording layer 35 is amorphous and when the recording layer 35 is crystal. In addition, the reflective layer 32 has thermal function of quickly diffusing the heat generated in the recording layer 35 to quench the recording layer 35, whereby amorphization of the recording layer 35 is facilitated. Furthermore, the reflective layer 32 also has function of protecting multi-layered film containing layers ranging from the dielectric layer 33 to the dielectric layer 37 from usage environment in which the medium is used.

The reflective layer 32 must function to quickly diffuse the heat of the recording layer 35. In addition, as described above, the light absorption in the reflective layer 32 is desirably small since the third information layer 30 requires high light transmittance. Therefore, the reflective layer 32 is preferably designed to be thin, and a material having larger heat conductivity is preferably used as a material for the reflective layer 32, which can quickly diffuse heat even in a form of thin film.

Specifically, the reflective layer 32 is preferably formed of Ag or Ag alloy. When the reflective layer 32 is formed of Ag alloy, it may be formed using an alloy material(s) such as Ag—Pd, Ag—Pd—Cu, Ag—Ga, Ag—Ga—Cu, Ag—Cu or Ag—Bi. Alternatively, the reflective layer 32 may be formed using a material in which rare earth metal(s) is added to Ag or Ag—Cu. Among them, Ag—Pd—Cu is preferably used since it has small light absorptivity, high heat conductivity and excellent humidity resistance.

The thickness of the reflective layer 32 is adjusted based on the relation with the thickness of the recording layer. The thickness of the reflective layer 32 is preferably 3 nm or more and 15 nm or less. When the thickness is smaller than 3 nm, uniform thin film is difficult to be formed and the heat-diffusing function of the reflective film may be decreased, so that a mark is difficult to be formed in the recording layer 35. In addition, the thickness is larger than 15 nm, the light transmittance of the third information layer 30 is less than 53%.

The composition of the above-mentioned reflective layer 32 can be analyzed by, for example, high-frequency inductively-coupled plasma (IPC) emission spectroscopic analysis, X-ray microanalyzer (XMA) or electron probe microanalyzer (EPMA). The reflective layer 32 formed by sputtering inevitably contains, in addition to the atoms in a reflective-layer material as described above, components coming from rare gases which are present in a sputtering atmosphere (Ar, Kr, Xe), components coming from moisture (O—H), components coming from organic substances (C), components coming from air (N, O), components of jigs provided in the sputtering room (metals), impurities contained in a target (metals, semimetals, semiconductors, dielectric) and the like, and these components may be detected by analysis such as ICP emission spectroscopic analysis, XMA, EPMA or the like. These inevitable components may be contained in an amount of up to 10 atomic %, assuming that the total of atoms contained in the reflective layer 32 is 100 atomic %. This also applies similarly to the reflective layers 22 and 12 described below.

The dielectric layer 33 and the dielectric layer 37 have function of adjusting Rcg, Rag, Tc and Ta of the third information layer 30 by adjusting optical distance. In addition, it has functions of enhancing the light absorption efficiency of the recording layer 35 and of protecting the recording layer 35 from moisture and the like. Furthermore, the dielectric layer 37 has function of protecting the transparent layer 2 from heat generated in the recording layer 35 upon recording. It is preferable that the dielectric layer 33 and the dielectric layer 37 have higher transparency to laser wavelength to be used and are excellent in humidity resistance as well as heat resistance.

An oxide, a complex oxide or a mixture containing oxide is preferably used as the material of the dielectric layer 33. In addition, when the reflective layer 32 is formed using Ag or Ag alloy, it is more preferable that the dielectric layer 33 does not contain sulfide.

The oxides include $Al_2O_3$, $Bi_2O_3$, $CaO$, $Cr_2O_3$, $Dy_2O_3$, $Ga_2O_3$, $HfO_2$, $In_2O_3$, $MgO$, $Nb_2O_5SiO_2$, $SnO_2$, $Ta_2O_5$, $TiO_2$, $WO_3$, $Y_2O_3$, $ZnO$, $ZrO_2$ and the like.

The complex oxides include $Al_2TiO_5$, $Al_6Si_2O_{13}$, $Bi_2Ti_2O_7$, $ZrSiO_4$ and the like.

The mixtures include, for example, $ZrO_2$—$SiO_2$, $ZrO_2$—$Cr_2O_3$, $ZrO_2$—$SiO_2$—$Cr_2O_3$, $ZrO_2$—$Ga_2O_3$, $ZrO_2$—$SiO_2$—$Ga_2O_3$, $ZrO_2$—$In_2O_3$, $ZrO_2$—$SiO_2$—$In_2O_3$ and the like.

A complex oxide or a mixture containing $ZrO_2$ has higher transparency to the wavelength around 405 nm and excellent heat resistance. In the material containing $ZrO_2$, partially stabilized zirconia or stabilized zirconia may be used in place of $ZrO_2$, in which any of $CaO$, $MgO$ and $Y_2O_3$ is added into $ZrO_2$. Alternatively, in the material containing $ZrO_2$, $HfO_2$ which has chemical characteristics similar to those of $ZrO_2$ may be used in place of $ZrO_2$, or a part of $ZrO_2$ may be substituted with $HfO_2$.

The dielectric layer 33 is preferably formed using a material containing at least one of the oxides exemplified above, at least one of the complex oxides exemplified above or at least one of the mixtures exemplified above. Alternatively, the dielectric layer 33 may be formed by laminating two or more layers each of which contains the above-mentioned oxide, complex oxide or mixture.

On the other hand, the dielectric layer 37 located on the light incident side of laser beam 5 is preferably formed using more transparent material. For example, ZnS—$SiO_2$ is suitable for the formation of the dielectric layer 37 since:

ZnS—$SiO_2$ is amorphous and has low heat conductivity, high transparency and high refractive index; and ZnS—$SiO_2$ is a material having large formation rate when forming the film, excellent mechanical properties and humidity resistance. More specifically, a material having the composition of $(ZnS)_{80}(SiO_2)_{20}$ is preferably used.

Since the third information layer 30 requires high transmittance of 53% or more, the dielectric layer 33 more preferably contains 90 mol % or more at least one material selected from the above-mentioned oxides, complex oxides and mixtures containing the oxides. In addition, the dielectric layer 37 preferably contains 90 mol % or more ZnS—$SiO_2$.

Alternatively, the dielectric layer 37 may consist of two or more layers. For example, the dielectric layer 37 may have a constitution in which $(ZnS)_{80}(SiO_2)_{20}$ and an oxide are laminated, or a constitution in which $(ZnS)_{80}(SiO_2)_{20}$ and a complex oxide are laminated. In any of these cases, an oxide and the like having a refractive index close to that of the transparent layer 2 is preferably provided on the transparent layer 2 side.

The thickness of the dielectric layer is determined on the basis of optical path length which the dielectric layer should have. Here, "optical path length" is a product nd of refractive index n of the dielectric layer and the thickness d of the dielectric layer and represented by nd=aλ (λ is a wavelength of laser beam 5, and a is a positive number). The optical path length can be determined precisely by, for example, a calculation based on a matrix method (see, for example, "Wave Optics", Hiroshi Kubota, Iwanami Shinsho, 1971, Section 3) so as to achieve a desirable reflectance and transmittance in the first information layer. The thickness d of the dielectric layer can be determined from the optical path length nd.

In the present embodiment, the third information layer 30 is designed to have the transmittance [(Tc+Ta)/2] of 56%, the reflectance Rcg of 2.6% and Rag. of 0.4%. These values are examples and may be other values. In this design, when the dielectric layer 33 and the dielectric layer 37 are formed using a dielectric material having a refractive index of 1.8 to 2.8, the thickness of the dielectric layer 33 is preferably 15 nm or less, and more preferably 2 nm or more and 12 nm or less. In addition, the thickness of the dielectric layer 37 is preferably 15 nm or more and 50 nm or less, and more preferably 25 nm or more and 45 nm or less.

The dielectric layer 33 can be optionally provided. When the interface layer 34 described below also has the function of the dielectric layer 33 described above, the dielectric layer 33 is not necessarily required to be provided. For example, the information layer 30 may have a configuration in which the dielectric layer 31, the reflective layer 32, the interface layer 34, the nucleation layer 38, the recording layer 35, the interface layer 36 and the dielectric layer 37 are provided in this order on the intermediate layer 4.

The interface layer 34 and the interface layer 36 are described. The interface layer 34 is provided in contact with the nucleation layer 38, and the interface layer 36 is provided in contact with the recording layer 35. The interface layer 34 and the interface layer 36 have function of preventing materials from diffusing from other layers into the recording layer 35 and the nucleation layer 38 which are formed of chalcogenide materials, and function of bonding each of the recording layer 35 and the nucleation layer 38 and another layer.

Specifically, the interface layer 34 is provided to bond the nucleation layer 38 and the dielectric layer 33. Alternatively, the interface layer 34 may be provided to prevent materials from diffusing from the dielectric layer 33 into the nucleation layer 38. When the nucleation layer 38 is not formed in a shape of uniform film but in a shape of islands, the interface layer 34 fulfills the similar functions to the recording layer 35.

The interface layer 36 may be provided to prevent materials from diffusing from the dielectric layer 37 into the recording layer 35. For example, when the interface layer 36 is formed of $(ZnS)_{80}(SiO_2)_{20}$, there is a problem that S in $(ZnS)_{80}(SiO_2)_{20}$ diffuses into the recording layer 35 upon repeated overwriting by irradiation the recording layer 35 with laser beam 5, resulting in significant decrease in the repeated overwriting characteristics. The diffusion of S is prevented by providing the interface layer 36, whereby the repeated overwriting characteristics can be improved.

The interface layers 34 and 36 must satisfy the following conditions;
i) they have high melting points and decomposition temperatures and do not melt nor diffuse upon recording,
ii) they have good adhesiveness to the recording layer 35 of calcogenide material or the nucleation layer 38 of chalocogenide material.

During a series of recording and erasing operations, the temperatures of the interface layers 34 and 36 reach the highest value upon recording since a region in which recording mark is formed is heated, upon recording, to the melting point or more to melt. The melting point of the recording layer 35 used in the present invention is about 700° C. The interface layers 34 and 36 preferably have a nominal melting point of 1000° C. or more such that they do not melt upon recording. It is because there is a possibility of causing diffusion, decomposition or melting at a temperature below the nominal melting point when the oxides described below have a shape of thin film with a thickness of a few nanometers.

An oxide, a complex oxide or a mixture containing an oxide is preferably used as a material of the interface layer 34 and the interface layer 36.

The oxides include, for example, $Al_2O_3$, $CaO$, $Cr_2O_3$, $Ga_2O_3$, $HfO_2$, $In_2O_3$, $MgO$, $SiO_2$, $Y_2O_3$ and $ZrO_2$.

The complex oxides include $Al_6Si_2O_{13}$ and $ZrSiO_4$.

The mixtures containing oxide include such as $Al_2O_3$—$Cr_2O_3$, $Al_2O_3$—$SiO_2$—$Cr_2O_3$, $Al_2O_3$—$Ga_2O_3$, $Al_2O_3$—$SiO_2$—$Ga_2O_3$, $Al_2O_3$—$In_2O_3$, $Al_2O_3$—$SiO_2$—$In_2O_3$, $ZrO_2$—$Cr_2O_3$, $ZrO_2$—$SiO_2$—$Cr_2O_3$, $ZrO_2$—$Ga_2O_3$, $ZrO_2$—$SiO_2$—$Ga_2O_3$, $ZrO_2$—$In_2O_3$, $ZrO_2$—$SiO_2$—$In_2O_3$, $HfO_2$—$Cr_2O_3$, $HfO_2$—$SiO_2$—$Cr_2O_3$, $HfO_2$—$Ga_2O_3$, $HfO_2$—$SiO_2$—$Ga_2O_3$, $HfO_2$—$In_2O_3$ and $HfO_2$—$SiO_2$—$In_2O_3$.

The interface layer 34 and the interface layer 36 are preferably formed using a material containing at least one of the above-exemplified oxides, at least one of the above-exemplified complex oxides or at least one of the above-exemplified mixtures.

In the material containing $ZrO_2$, partially stabilized zirconia or stabilized zirconia may be also used in place of $ZrO_2$, in which any of $CaO$, $MgO$ and $Y_2O_3$ is added into $ZrO_2$. Alternatively, in the material containing $ZrO_2$, $HfO_2$ which has chemical characteristics similar to those of $ZrO_2$ may be used in place of $ZrO_2$, or a part of $ZrO_2$ may be substituted with $HfO_2$.

The thickness of the interface layer 34 is preferably 1 nm or more so as to ensure adhesion thereof to the nucleation layer 38 or optionally adhesion thereof to the nucleation layer 38 and the recording layer 35 and to suppress atom diffusion from another layer to the nucleation layer 38 and optionally to the recording layer 35. In addition, the total thickness of the interface layer 34 and the dielectric layer 33 is preferably 20 nm or less, and more preferably 3 nm or more and 17 nm or less.

The thickness of the interface layer 36 is preferably 1 nm or more so as to ensure an adhesion thereof to the recording layer 35 and to suppress atom diffusion from another layer to the recording layer 35. In addition, when the material has larger extinction coefficient, the interface layer 36 is preferably thinner so as not to provide optical influences on other layers. The total thickness of the interface layer 36 and the dielectric layer 37 is preferably 16 nm or more and 55 nm or less, and more preferably 26 nm or more and 50 nm or less.

In the complex refractive index n-ik of the interface layers 34 and 36 (n: refractive index, k: extinction coefficient), k is preferably 0.10 or less, and more preferably 0.07 or less.

The composition of the dielectric layers 31, 33 and 37 as well as the interface layers 34 and 36 can be analyzed by, for example, X-ray microanalyzer (XMA), electron probe microanalyzer (EPMA) or Rutherford backscattering spectrometry (RBS). The dielectric layers 31, 33 and 37 as well as the interface layers 34 and 36 formed by sputtering inevitably contain, in addition to the atoms contained in the material for the dielectric layer and the interface layer as described above, components coming from rare gases which are present in a sputtering atmosphere (Ar, Kr, Xe), components coming from moisture (O—H), components coming from organic substances (C), components coming from air (N, O), components of jigs provided in the sputtering room (metals), impurities contained in a target (metals, semi-metals, semiconductors, dielectric) and the like, and these components may be detected by these analytical methods. These inevitable components may be contained in an amount of up to 10 atomic %, assuming that the total of atoms contained in the interface layer or the dielectric layer is 100 atomic %. This also applies similarly to the dielectric layers 21, 23, 27, 11, 13 and 17 as well as the interface layers 24, 26, 14 and 16 described below.

Next, the configuration of the second information layer 20 is described.

The second information layer 20 is formed by providing the dielectric layer 21, reflective layer 22, the dielectric layer 23, the interface layer 24, the nucleation layer 28, the recording layer 25, the interface layer 26 and the dielectric layer 27 in this order on one surface of the intermediate layer 3.

The second information layer 20 is located further from the side on which laser beam 5 enters (specifically the surface of the transparent layer 2) compared to the third information layer 30 and closer to this side compared to the first information layer 10. Therefore, the second information layer 20 is designed to have high transmittance so as to allow laser beam 5 to reach the first information layer 10. Specifically, assuming that the light transmittance of the second information layer 20 is Tc (%) when the recording layer 25 is in the crystal phase and that the light transmittance of the second information layer 20 is Ta (%) when the recording layer is in the amorphous layer, they preferably satisfy 47%≤(Ta+Tc)/2 and more preferably 50%≤(Ta+Tc)/2. For example, the second information layer 20 may be designed to have the transmittance [(Tc+Ta)/2] of 50%, the reflectance Rcg of 5.5% and Rag of 0.7%. When [(Tc+Ta)/2] of the second information layer 20 is 50%, Tc may be 49%, and Ta may be 51%. Alternatively, Tc may be 50% and Ta may be 52%. Tc and Ta are not necessarily the same, but preferably close in values. Any of these values are examples and may be other values.

The recording layer 25 has functions similar to those of the recording layer 35, and the preferable composition of the recording layer 25 is also similar to that of the recording layer 35. In addition, the thickness of the recording layer 25 is preferably 4 nm or more and 9 nm or less since the second information layer 20 requires light transmittance of 47% or more. When the thickness exceeds 9 nm, the light transmittance of the second information layer 20 is decreased; when the thickness is less than 4 nm, the optical change of the recording layer 25 is decreased. The composition of the recording layer 25 (that is, the composition of the material represented by the formula (1)) preferably has higher crystallization speed than that for the composition of the recording layer 15 since the recording layer having decreased thickness has a decreased crystallization speed.

The nucleation layer 28 has function of decreasing the crystal particle diameter in the recording layer 25, similarly to the nucleation layer 38. Preferable composition and thickness are also similar to those of the nucleation layer 38. In addition, the nucleation layer may be located between the recording layer and the interface layer 26, or located on both sides of the recording layer.

The dielectric layer 21 has functions similar to those of the dielectric layer 31, and the preferable material is also similar to that of the dielectric layer 21. The thickness of the dielectric layer 21 is preferably 10 nm or more and 30 nm or less such that a reflectance ratio of 4 or more and a light transmittance of 47% or more is obtained in the second information layer 20. It should be noted that the dielectric layer 21 may also consist of two or more layers.

The reflective layer 22 has functions similar to those of the reflective layer 32, and the preferable material is also similar to that of the reflective layer 32. The thickness is preferably 5 nm or more and 18 nm or less. When the thickness is less than 5 nm, the function of diffusing heat is decreased, whereby a mark is difficult to be formed in the recording layer 25. When the thickness is more than 18 nm, the light transmittance of the second information layer 20 may be less than 47%.

The dielectric layer 23 and the dielectric layer 27 have function of adjusting Rcg, Rag, Tc and Ta in the second information layer 20 similarly to the dielectric layer 33 and the dielectric layer 37. In addition, the dielectric layer 23 and the dielectric layer 27 have functions of increasing light absorption efficiency of the recording layer 25 and of protecting the recording layer 25 from moisture and the like. Furthermore, the dielectric layer 27 has function of protecting the intermediate layer 4 from heat generated in the recording layer 25 upon recording. The dielectric layer 23 and the dielectric layer 27 preferably have high transparency to laser wavelength used and excellent heat resistance as well as humidity resistance.

The same materials as those for the dielectric layer 33 can be listed as materials for the dielectric layer 23. Alternatively, the dielectric layer 23 is also formed of two or more layers.

On the other hand, the dielectric layer 27 located on the side on which layer beam 5 enters is preferably formed of more transparent material, and specifically, of $ZnS$—$SiO_2$ similarly to the dielectric layer 37. More specifically, a material having a composition of $(ZnS)_{80}(SiO_2)_{20}$ is preferably used.

The dielectric layer 23 more preferably contains 90 mol % or more the preferable material(s) described with respect to the dielectric layer 33 as is the case with the dielectric high transmittance of 47% or more. In addition, the dielectric layer 27 preferably contains 90 mol % or more $ZnS$—$SiO_2$.

In the present embodiment, the second information layer 20 is designed to have the transmittance [(Tc+Ta)/2] of 50%, the reflectance Rcg of 5.5% and Rag of 0.7%. In addition, the effective Rcg and the effective Rag of the second information layer 20 are 1.7% and 0.2%, respectively. These values are examples, and may be other values.

In this design, when the dielectric layer 23 and the dielectric layer 27 are formed by use of a dielectric material having the refractive index of 1.8 to 2.8, the thickness of the dielectric layer 23 is preferably 15 nm or less, more preferably 2 nm or more and 12 nm or less. In addition, the thickness of the dielectric layer 27 is preferably 15 nm or more and 50 nm or less, more preferably 25 nm or more and 45 nm or less.

The dielectric layer 23 and the dielectric layer 27 can be optionally provided as is the case with the dielectric layer 33. When the interface layer 24 also fulfills the function of the dielectric layer 23, the dielectric layer 23 is not necessarily required to be provided. Similarly, when the interface layer 26 also fulfills the function of the dielectric layer 27 describe above, the dielectric layer 27 is not necessarily required to be provided.

The interface layer 24 and the interface layer 26 have functions similar to those of the interface layer 34 and the interface layer 36, and the preferable material(s) for these layers are also similar to those for the interface layer 34 and the interface layer 36.

The thickness of the interface layer 24 is preferably 1 nm or more such that the adhesiveness to the nucleation layer 28 and optionally to the recording layer 25 can be ensured and that the atom diffusion from another layer to the recording layer 35 can be suppressed. In addition, the total thickness of the interface layer 24 and the dielectric layer 23 is preferably 20 nm or less and more preferably from 3 nm to 17 nm.

The thickness of the interface layer 26 is preferably 1 nm or more such that the adhesiveness to the recording layer 25 can be ensured and that the atom diffusion from another layer to the recording layer 25 can be suppressed. In addition, when the material has larger extinction coefficient, the interface layer 26 is preferably thinner so as not to provide an optical influences the other layers. The total thickness of the interface layer 26 and the dielectric layer 27 is preferably 16 nm or more and 55 nm or less, and more preferably 26 nm or more and 50 nm or less.

In the complex refractive index n-ik (n: refractive index, k: extinction coefficient) of the interface layers 24 and 26, k is preferably 0.10 or less, and more preferably 0.07 or less.

Next, the configuration of the first information layer 10 is described.

The first information layer 10 is formed by providing the dielectric layer 11, the reflective layer 12, the dielectric layer 13, the interface layer 14, the nucleation layer 18, the recording layer 15, the interface layer 16 and the dielectric layer 17 in this order on one surface of a substrate 1.

In any of the information layers, signals must be recorded using a laser power within a range that can be output by the recording and reproduction apparatus, and the recorded signals must be detected using a reproduction power that can be output by the recording and reproduction apparatus. However, recording and reproduction of signals in the first information layer 10 are carried out by the attenuated laser beam 5 passing through the third information layer 30 and the second information layer 20. As a result, the first information layer 10 is designed to have high reflectance ratio and high light absorptivity unlike the third information layer 30 and the second information layer 20 which are translucent. For example, it is necessary to set Rcg to 19% or more and Rc to 23% or more in order that the effective Rcg is at least 1.5%.

The dielectric layer 11 has functions of preventing water absorbed by the substrate 1 from entering into the reflective layer 12 and of suppressing columnar growth of the reflective layer 12 to reduce a noise in the reflective layer 12.

A material for the dielectric layer 11 preferably contains an oxide. When the reflective layer 12 is formed using Ag or Ag alloy, the dielectric layer 11 preferably contains no sulfide. The dielectric layer 11 preferably contains, for example, at least one oxide selected from a group consisting of $Bi_2O_3$, $TiO_2$, $Al_2O_3$, $Cr_2O_3$, $Dy_2O_3$, $Ga_2O_3$, $HfO_2$, $In_2O_3$, $Nb_2O_5$, $SiO_2$, $SnO_2$, $Ta_2O_5$, $WO_3$, $Y_2O_3$, ZnO and $ZrO_2$.

The preferable thickness of the dielectric layer 11 is 3 nm or more. When the thickness is less than 3 nm, the function of preventing water from entering into the reflective layer 12 is reduced. Larger thickness has small effect on the reflectance; however, the thickness is preferably 30 nm or less considering the productivity. The dielectric layer 11 may be optionally provided.

The reflective layer 12 has functions similar to those of the reflective layer 32. Since the first information layer 10 is not required to be translucent, the thickness of the reflective layer 12 can be larger and thus, there are more options for the material(s) for the reflective layer 12. The reflective layer 12 can be formed using metal(s) selected from Al, Au, Ag and Cu or alloy(s) thereof. Another element(s) can be added to the above-mentioned metals or alloys in order to improve the humidity resistance of the reflective layer 12 and/or to adjust heat conductivity or optical characteristics (for example, light reflectance, light absorptance or light transmittance). The additive(s) is preferably selected from a group consisting of Mg, Ca, Sc, Y, Ti, Zr, Hf, V, Nb, Ta, Cr, Mo, W, Mn, Fe, Ru, Os, Co, Rh, Ni, Pd, Pt, Zn, B, Ga, In, C, Ge, Sn, N, Sb, Bi, O, Te, La, Ce, Pr, Nd, Sm, Eu, Gd, Tb, Dy, Ho, Er, Tm, Yb and Lu. The additive concentration is preferably 3 atomic % or less.

The reflective layer 12 preferably has decreased light absorptivity to the wavelength of the laser beam to be used so as to increase the amount of light absorbed in the recording layer 15. The reflective layer 12 containing more than or equal to 97 atomic % Ag is preferably used in the first information layer 10 since Ag has decreased light absorptivity to the wavelength of about 405 nm. Specifically, an alloy material(s) selected from a group consisting of Ag—Pd, Ag—Cu, Ag—Bi, Ag—Ga—Cu, Ag—In—Sn, Ag—Pd—Cu, Ag—Pd—Ti and the like, can be used. Among them, Ag—Ga—Cu is preferably used which has excellent humidity resistance and small crystal particle diameter.

In addition, the reflective layer 12 may be formed of two or more layers. In that case, a layer provided on the substrate 1 side may be formed of a dielectric material. The thickness of the reflective layer 12 is adjusted in accordance with a linear velocity of the medium used and the composition of the recording layer 15, and is preferably 40 nm or more and 300 nm or less. When the thickness is less than 40 nm, the recording layer cannot be quenched sufficiently and the heat in the recording layer is difficult to be diffused, so that amorphization of the recording layer is difficult. When the thickness is more than 300 nm, the recording layer is quenched excessively, and the heat in the recording layer 15 is diffused excessively, so that the record sensitivity is deteriorated (in other word, larger laser power is required to record signals).

The dielectric layer 13 and the dielectric layer 17 have functions similar to those of the dielectric layer 33 and the dielectric layer 37. Preferable materials for those layers are also similar to those for the dielectric layer 33 and the dielectric layer 37. The thicknesses of the dielectric layers 13 and 17 are determined on the basis of optical path length which the dielectric layers 13 and 17 should have. The optical path length can be determined precisely by, for example, a calculation based on the matrix method (see, for example, "Wave Optics", Hiroshi Kubota, Iwanami Shinsho, 1971, Section 3) so as to enhance Rcg of the first information layer 10 so that Rcg/Rag is increased and to increase Ac (light absorptance of the recording layer 15 in amorphous phase).

In the present embodiment, the thickness of each layer consisting of the first information layer 10 is set such that Rcg and Rag of the first information layer 10 is 23% and 3%, respectively. When the dielectric layer 13 and the dielectric layer 17 are formed by use of a dielectric material having a refractive index of 1.5 to 2.8, the thickness of the dielectric layer 13 is preferably 30 nm or less, and more preferably 5 nm or more and 20 nm or less. Further, the thickness of the dielectric layer 17 is preferably 30 nm or more and 130 nm or less, and more preferably 30 nm or more and 100 nm or less.

The dielectric layer 13 and the dielectric layer 17 can be optionally provided, similarly to the dielectric layer 33. When the interface layer 14 also fulfills the function of the dielectric layer 13, the dielectric layer 13 is not necessarily required to be provided. Similarly, when the interface layer 16 also fulfills the function of the dielectric layer 17, the dielectric layer 17 is not necessarily required to be provided.

The interface layer 14 and the interface layer 16 have functions similar to those of the interface layers 34 and 36, and the preferable materials these layers are also similar to those for the interface layers 34 and 36.

The thickness of the interface layer 14 is preferably 1 nm or more such that adhesiveness to the nucleation layer 18 and optionally to the recording layer 15 can be ensured, and atom diffusion from another layer to the nucleation layer 18 and optionally to the recording layer 15 can be suppressed. In addition, the total thickness of the interface layer 14 and the dielectric layer 13 is preferably 35 nm or less, and more preferably 6 nm or more and 25 nm or less. The functions of the interface layer and the dielectric layer may be fulfilled by the interface layer 14 without providing the dielectric layer 13 since the interface layer 14 is formed by use of a material having high transparency. In this case, the interface layer 14 may be made thick up to the thickness of 35 nm.

The thickness of the interface layer 16 is preferably 1 nm or more such that adhesiveness to the recording layer 15 is ensured and atom diffusion from another layer to the recording layer 15 is suppressed. In addition, when the material has larger extinction coefficient, the interface layer 16 is preferably thinner so as not to give optical influences on other layers. The total thickness of the interface layer 16 and the dielectric layer 17 is preferably 31 nm or more and 135 nm or less and more preferably 35 nm or more and 110 nm or less.

In the embodiment illustrated in the drawing, the first information layer 10 includes the nucleation layer 18 and the recording layer 15. The recording layer 15 has functions similar to those of the recording layer 35. Since the preferable thickness of the recording layer 15 is larger compared to that of the recording layer 25 and that of the recording layer 35, the recording layer 15 may be formed by use of the recording material represented by the formula (1) described with respect to the recording layer 35. Alternatively, it may be formed by use of another recording material.

As another material for the recording layer (rewritable type) which can cause a reversible phase change, GeTe—$Sb_2Te_3$ pseudobinary-based material containing 40 atomic % or more Ge may be used, for example. In this case, a part of Sn may be substituted for Ge, or at least one element selected from a group consisting of In, Ga, Al and Bi may be substituted for a part of Sb. Alternatively, GeTe—$Bi_2Te_3$ pseudobinary-based material containing 40 atomic % or more Ge may be used. In this case, Sn may be substituted for a part of Ge, or at least one element selected form a group consisting of In, Ga, Al and Sb may be substituted for a part of Bi.

Alternatively, the recording layer 15 may be formed by use of Sb—Te eutectic-based material containing 60 atomic % or more Sb. In this case, at least one element selected from a group consisting of Ag, In and Ge may be added such that the ratio is 10 atomic % or less. Alternatively, at least one element selected from a group consisting of B, C, Si and Zn may be added such that the ratio is 10 atomic % or less. Alternatively, the recording layer 15 may be formed by use of Ge—Sb eutectic-based material containing 60 atomic % or more Sb. In this case, at least one element selected from a group consisting of Ag, In, Te, B, C, Si and Zn may be added such that the ratio is 15 atomic % or less.

The composition analysis of the recording layer 15 can be carried out by, for example, X-ray microanalyzer (XMA) or electron probe microanalyzer (EPMA) when the recording layer 15 contains light elements such as C and B.

The thickness of the recording layer 15 is preferably 5 nm or more and 15 nm or less. When the thickness exceeds 15 nm, the heat capacity of the layer is increased and thus, the laser power required upon recording is increased. In addition, when the thickness is large, the heat generated in the recording layer 15 is difficult to diffuse toward the direction of the reflective layer 12, and thus, a small recording mark required for high density recording is difficult to be formed. When the thickness is less than 5 nm, Rag is increased and Rcg/Rag is decreased and thus, good readout signal is difficult to be obtained.

The nucleation layer 18 may be optionally provided. When the nucleation layer 18 is provided, the nucleation layer 18 may be formed by use of the material represented by the formula (2) as is the case with the nucleation layer 38. In that case, preferable composition and preferable thickness of the nucleation layer 18 are the same as those of the nucleation layer 38. When the recording layer 15 is formed by use of the recording material represented by the formula (1), which is described as the material for the recording layer 35, it is preferable to provide the nucleation layer 18 in order to decrease a diameter of the crystal particle in the recording layer 15.

In the information recording medium of the present invention, the recording layer containing the material represented by the above-mentioned formula (1) and the nucleation layer containing the material represented by the above-mentioned formula (2) are included in at least one information layer, and preferably in the information layer which is located on the light incident side. For example, in a variation of the information recording medium 100 in the present embodiment, only the third information layer 30 may include the recording layer 35 containing the material of the formula (1) and the nucleation layer 38 containing the material of the formula (2). Alternatively, in another variation, the second information layer 20 and the third information layer 30 may include the recording layer 25 and the recording layer 35 which contain the material of the formula (1) and the nucleation layer 28 and the nucleation layer 38 which contain the material of the formula (2). Alternatively, all of the information layers (10, 20 and 30) may include the recording layers (15, 25 and 35) containing the material of the formula (1) and the nucleation layer (18, 28 and 38) containing the material of the formula (2).

Alternatively, in the information recording medium of another embodiment which has three information layers, the first information layer (corresponding to the information layer indicated by 10 in FIG. 1) may include write-once-type recording layer, and the second information layer and the third information layer (corresponding to the information layers indicated by 20 and 30 in FIG. 1) may include a recording layer containing a material of the formula (1) and a nucleation layer containing a material of the formula (2) as is the case with Embodiment 1, for example. Alternatively, in the information recording medium of still another embodiment which has three information layers, the first information layer (corresponding to the information layer indicated by 10 in FIG. 1) may be read-only-type information layer, the second information layer (corresponding to the information layer indicated by 20 in FIG. 1) may include write-once-type recording layer, and the third information layer (corresponding to the information layer indicated by 30 in FIG. 1) may include a recording layer containing a material of the formula (1) and a nucleation layer containing a material of the formula (2).

The recording layer (of write-once type) which can cause irreversible phase change may be formed by use of, for example, oxide material containing at least one selected from a group consisting of Te—O, Sb—O, Ge—O, Sn—O, In—O, Zn—O, Mo—O, W—O and the like or organic dye-type recording material. Alternatively, the write-once-type recording layer may be formed by laminating two or more layers, and materials contained in the respective layers may alloy or react upon recording.

The read-only-type information layer may be formed by forming a reflective layer of a material containing at least one selected from a group consisting of metal element, metal alloys, dielectric, dielectric compounds, semiconductor elements and semi-metal elements on a recording pit formed on a substrate (or an intermediate layer) in advance. For example, the reflective layer may be a layer containing Ag or Ag alloy. Alternatively, the first information layer may be a layer in which magneto-optical recording layer is formed as a recording layer.

In a further embodiment of the present invention, the information recording medium may include four or more information layers. The effects of the present invention can be obtained in any embodiments which include three or more information layers.

In the information recording medium of the present invention (including the information recording medium 100 of Embodiment 1), information can be recorded in accordance with either a Constant Linear Velocity (CLV) recording mode or a Constant Angular Velocity (CAV) recording mode.

The recording and reproduction of information in the information recording medium of the present invention (including the information recording medium 100 of Embodiment 1) are preferably carried out using an optical system wherein a numerical aperture Na of an objective lens is 0.85. However, NA is not limited to this and the recording and reproduction may be carried out using the optical system with NA>1. Solid Immersion Lens (SIL) or Solid Immersion Mirror (SIM) can be used as the optical system with NA>1. When these systems are used, the intermediate layer and the transparent layer may be formed into layers having thicknesses of 5 µm or less, respectively. Alternatively, the recording and reproduction of information may be carried out using an optical system which uses near-field light.

Subsequently, a method for manufacturing the information recording medium 100 of Embodiment 1 is described.

The information recording medium 100 is manufactured by forming the first information layer 10, the intermediate layer 3, the second information layer 20, the intermediate layer 4, the third information layer 30 and the transparent layer 2 in this order on the substrate 1 which is a support. The first information layer 10 is formed by placing the substrate, in which a guide groove (groove surface and land surface) are formed, in a sputtering apparatus and then forming the dielectric layer 11, the reflective layer 12, the dielectric layer 13, the interface layer 14, the nucleation layer 18, the recording layer 15, the interface layer 16 and the dielectric layer 17 in this order on the surface of the substrate 1 in which the guide groove is formed.

The substrate 1 on which the first information layer 10 is formed is taken from the sputtering apparatus and then, the intermediate layer 3 is formed.

The intermediate layer 3 is formed by the following procedures. First, an ultraviolet-curing resin is applied by means of, for example, spin coating on the surface of the dielectric layer 17. Next, a polycarbonate plate having concavities and convexities complementary to guide groove to be formed on the intermediate layer 3 is laminated on the ultraviolet-curing resin such that the concavo-convex side of the plate is brought into contact with the ultraviolet-curing resin. Irradiation of ultraviolet rays is carried out in that state to cure the resin, and then, the polycarbonate plate having concavities and convexities is removed. As a result, the guide groove having a shape complementary to the above-mentioned concavities and convexities are formed in the ultraviolet-curing resin, and thus, the intermediate layer 3 having guide groove is formed.

The shape of the guide groove formed in the substrate 1 may be the same as or different from the shape of the guide groove formed in the intermediate layer 3. In an alternate process, the intermediate layer 3 may be formed by forming a layer for protecting the dielectric layer 17 from the ultraviolet-curing resin, and by forming a layer having a guide groove on the protection layer. In this case, the resultant intermediate layer 3 has two-layered structure. Alternatively, the intermediate layer 3 may be constituted by lamination of three or more layers. In addition, the intermediate layer 3 may be formed by means of a method other than spin coating, for example, a printing method, an ink-jet method or a casting method.

The substrate 1 on which the intermediate layer 3 is formed is placed in the sputtering apparatus again, and the dielectric layer 21, the reflective layer 22, the dielectric layer 23, the interface layer 24, the nucleation layer 28, the recording layer 25, the interface layer 26 and the dielectric layer 27 are formed in this order on the intermediate layer 3 at the side having the guide grooves. In this way, the second information layer 20 is formed on the intermediate layer 3.

The substrate 1 on which the second information layer 20 is formed is taken from the sputtering apparatus, and the intermediate layer 4 is formed in similar way to the intermediate layer 3.

The substrate 1 on which the intermediate layer 4 is formed is placed in the sputtering apparatus again, and the dielectric layer 31, the reflective layer 32, the dielectric layer 33, the interface layer 34, the nucleation layer 38, the recording layer 35, the interface layer 36 and the dielectric layer 37 are formed in this order on the surface of the intermediate layer 4 which has the guide groove. In this way, the third information layer 30 is formed on the intermediate layer 4.

The substrate 1 on which the third information layer 30 is formed is taken from the sputtering apparatus. And then, the transparent layer 2 is formed on the dielectric layer 37.

The transparent layer 2 is formed by the following procedures. The transparent layer 2 having an intended thickness can be formed by applying an ultraviolet-curing resin on the surface of the dielectric layer 37 by means of, for example, spin coating method, and by irradiating the resin with ultraviolet rays to cure the resin. Alternatively, the transparent layer 2 can be also formed by applying the ultraviolet-curing resin on the surface of the dielectric layer 37 by means of spin coating method, and then bringing a disc-shaped sheet into contact with the applied ultraviolet-curing resin, followed by irradiating the resin with ultraviolet rays to cure the resin. Alternatively, the transparent layer 2 can be formed by attachment of a disc-shaped sheet having an adhesive layer.

The transparent layer 2 may consist of a plurality of layers having different physical properties. For example, another transparent layer may be provided on the surface of the dielectric layer 37, and then the transparent layer 2 may be formed. Alternatively, the transparent layer 2 may be formed on the surface of the dielectric layer 37, and then another transparent layer may be formed on the surface of the transparent layer 2. A plurality of these transparent layers may have different viscosity (a viscosity prior to curing), hardness, refractive index and/or transparency.

In this way, the transparent layer 2 is formed.

After completing the formation of the transparent layer 2, initialization of the first information layer 10, the second information layer 20 and the third information layer 30 is optionally performed.

The initialization is a step in which the recording layers 15, 25 and 35 in amorphous phase is heated to the crystallization temperature or more to be crystallized by irradiation with semiconductor laser or the like. Favorable initialization can be performed by optimizing the power of the semiconductor laser, rotating velocity of the information recording medium, sending speed of the semiconductor laser in a radial direction, focal position of the laser and the like. The initialization may be performed after or before forming the transparent layer 2. Alternatively, the initialization may be performed after forming the first information layer 10 and then the intermediate layer 3 and the second information layer 20 may be formed. The effects of the present invention can be obtained regardless of when the initialization is performed.

A process for forming each layer is described below. In the present embodiment, each layer is formed by use of sputtering method.

The dielectric layers 11, 13, 17, 21, 23, 27, 31, 33 and 37 are formed by sputtering a target containing elements, a mixture or compounds which constitute the dielectric layer. The sputtering may be carried out using a radio-frequency power supply in a rare gas atmosphere or in a mixed gas atmosphere of oxygen gas and/or nitrogen gas and a rare gas. If possible, direct-current power supply or pulse generation-type DC power supply may be used. The rare gas may be any one of an Ar gas, a Kr gas and a Xe gas. When the dielectric layer containing oxide is formed, sputtering may be carried out by use of a target in which oxygen deficiency is suppressed, or in an atmosphere in which a small amount of oxygen gas of 10% or less is mixed with a rare gas since the oxygen deficiency may occur during sputtering.

The reflective layers 12, 22 and 32 are formed by sputtering a target containing a metal or an alloy which constitutes the reflective layer. The sputtering may be carried out using a direct-current power supply or a radio-frequency power supply in a rare gas atmosphere or in a mixed gas atmosphere of an oxygen gas and/or a nitrogen gas and a rare gas. The rare gas may be any one of Ar gas, Kr gas and Xe gas.

The interface layers 14, 16, 24, 26, 34 and 36 are formed by sputtering a target containing elements, a mixture or a compound which constitute the interface layer. The sputtering may be carried out using a radio-frequency power supply in a rare gas atmosphere or in a mixed gas atmosphere of an oxygen gas and/or a nitrogen gas and a rare gas. If possible, direct-current power supply or pulse generation-type DC power supply may be used. The rare gas may be any one of an Ar gas, a Kr gas and a Xe gas. When the interface layer containing an oxide is formed, sputtering may be carried out by use of a target in which oxygen deficiency is suppressed, or in an atmosphere in which a small amount of oxygen gas of 10% or less is mixed with a rare gas since the oxygen deficiency may occur during sputtering.

The recording layers 15, 25 and 35 are formed by sputtering a target containing a material which constitutes the recording layer. The sputtering may be carried out using a direct-current power supply, a radio-frequency power supply or a pulse generation-type DC power supply in a rare gas atmosphere or in a mixed gas atmosphere of an oxygen gas and/or a nitrogen gas and a rare gas. The rare gas may be any one of an Ar gas, a Kr gas and a Xe gas. The composition of the target may be inconsistent with that of the formed recording layer depending on the sputtering apparatus. In such case, the composition of the target is adjusted to give the recording layer having an intended composition.

Alternatively, the recording layer may be formed by means of sputtering a plurality of targets at the same time. In this case, the recording layer having the intended composition can be obtained by control of the composition, which is made by adjusting outputs from the respective power supplies used for sputtering the respective targets. Alternatively, the recording layer may be formed by reactive sputtering. In this case, the recording layer having an intended composition can be obtained by adjusting flow rates and pressures of oxygen gas and nitrogen gas, and flow ratio and pressure ratio between oxygen gas and rare gas, in addition to adjusting the composition of the targets and outputs of the power supplies. Reactive sputtering is used when forming the recording layer containing an oxide or a nitride.

The nucleation layer is also formed by the sputtering method. The formation of the nucleation layer is carried out just before the formation of the recording layer such that the nucleation layer is in contact with the recording layer. In a manufacturing method wherein films are formed sequentially from the substrate 1 side, the recording layer having a reduced crystal particle diameter can be obtained by previously forming the nucleation layer since the recording layer is formed on the nucleation layer. Optionally, the formation of the nucleation layer may be also carried out just after forming the recording layer to obtain a constitution in which the nucleation layers are located on the both sides of the recording layer. Alternatively, the nucleation layer may be formed just after forming the recording layer. In this case, the crystal particle diameter in the recording layer can be reduced. The nucleation layers 18, 28 and 38 are formed by sputtering a target containing a material constituting the nucleation layer. The sputtering may be carried out using a direct-current power supply, a radio-frequency power supply or a pulse generation-type DC power supply in a rare gas atmosphere or in a mixed gas atmosphere of an oxygen gas and/or a nitrogen gas and a rare gas. The rare gas may be any one of an Ar gas, a Kr gas and a Xe gas. The composition of the target may be inconsistent with that of the formed nucleation layer depending on the sputtering apparatus. In such case, the composition of the target is adjusted to obtain the nucleation layer having an intended composition. Alternatively, the nucleation layer may be formed by sputtering using a plurality of targets as is the case with the recording layer.

Here, the sputtering method is used as a method for forming each layer; however, the method for forming films is not limited to this method. For example, each layer can be formed by a vacuum deposition method, an ion plating method, a chemical vapor phase deposition (CVD) method, a molecular beam epitaxy (MBE) method or the like.

In this way, the information recording medium 100 of Embodiment 1 can be manufactured.

The effects of the present invention can be obtained in the information recording medium irrespective of manufacturing method. For example, the present invention can be applied even if the information recording medium is manufactured by a method wherein the transparent layer 2 is a transparent supporting substrate, and the third information layer 30, the intermediate layer 4, the second information layer 20, the intermediate layer 3 and the first information layer 10 are formed in this order on the supporting substrate, and the substrate 1 is bonded with an ultraviolet-curing resin and the like. In this case, the order of sputtering the respective layers in the third information layer 30 is preferably as follows: the dielectric layer 37, the interface layer 36, the nucleation layer, the recording layer, the interface layer 34, the dielectric layer 33, the reflective layer 32 and the dielectric layer 31. As described above, the step of forming the nucleation layer is preferably carried out just before the step of forming the recording layer in order that the crystal particle diameter is reduced. Therefore, in the third information layer 100 in a medium obtained by this manufacturing method, the nucleation layer is located between the interface layer 34 and the recording layer, and the recording layer is in contact with the interface layer 36. Alternatively, the nucleation layers may be formed on both sides of the recording layer. In this case, a formation step of the nucleation layer is carried out just before and just after the formation step of the recording layer.

The information recording medium of the present invention may be formed by means of bonding a layered product in which two or more information layers are formed and a layered product in which one or more information layer is formed. For example, an information recording medium having three information layers may be manufactured by means of forming the first information layer, the intermediate layer, the second information layer and the intermediate layer in this order on the substrate, applying an ultraviolet-curing resin on the surface of the intermediate layer, and laminating, on said resin layer, a layered product having the third information layer formed on a sheet as a transparent layer, followed by irradiation with ultra-violet rays.

Next, the present invention is described in detail using Examples.

EXAMPLE 1

In Example 1, with respect to the recording layer 35 formed of the material represented by the formula (1) $[(Ge_{0.5}Te_{0.5})_x(In_{0.4}Te_{0.6})_{1-x}]_y Sb_{100-y}$, the relation between the value of y in the formula (1) and the optical change $|\Delta n|+|\Delta k|$ as well as the crystallization temperature was examined.

The present example is specifically described below. First, a form of a sample for determining the crystallization temperature and a method for preparing the sample are described. Quartz glass (diameter: 10 mm, thickness: 0.5 mm) was used as a substrate. A layer consisting of $(ZrO_2)_{25}(SiO_2)_{25}(Cr_2O_3)_{50}$ having a thickness of 5 nm was formed on the surface of this quartz glass, the recording layer having a thickness of 6 nm was formed on the surface of the nucleation layer, and a layer consisting of $(ZrO_2)_{25}(SiO_2)_{25}(Cr_2O_3)_{50}$ having a thickness of 5 nm was formed on the surface of the recording layer to obtain the sample.

As shown in Table 1, 10 types of Samples 1-1 to 1-6 and A-1 to A-4 in which materials for the recording layer are different from each other were prepared. Samples 1-1 to 1-6 are materials in which the recording layer consists of a material satisfying x=0.9 and y=95.0-99.5 in the formula (1). Sample A-1 is a sample in which the recording layer consists of a material satisfying y=94.0 in the formula (1), Sample A-2 is a sample in which the recording layer consists of a material satisfying y=100 in the formula (1), and Samples A-3 and A4 are samples in which the recording layer has a composition containing no In.

The layer consisting of $(ZrO_2)_{25}(SiO_2)_{25}(Cr_2O_3)_{50}$ was provided such that the recording layer had similar constitution to the recording layer 35 in the information recording medium 100 shown in FIG. 1 (in other words, a constitution wherein the recording layer 35 was sandwiched by the interface layers 34 and 36) in order to enhance measurement accuracy of the crystallization temperature of the recording layer 35. In addition, the layer consisting of $(ZrO_2)_{25}(SiO_2)_{25}(Cr_2O_3)_{50}$ has function of preventing the oxidation of the recording layer when measuring the crystallization temperature of the recording layer. As described above, the crystallization temperature is defined as a transition temperature of the recording layer from amorphous phase to crystal phase.

The respective layers were formed by sputtering. Conditions for the sputtering are described. All of the targets used were round-shaped, and had a diameter of 200 mm and a thickness of 6 mm. A quartz glass substrate was bonded to a polycarbonate substrate having a diameter of 120 mm and attached to a sputtering apparatus. The layer consisting of $(ZrO_2)_{25}(SiO_2)_{25}(Cr_2O_3)_{50}$ was formed on the quartz substrate by inputting a power of 3 kW into $(ZrO_2)_{25}(SiO_2)_{25}(Cr_2O_3)_{50}$ target by use of a radio-frequency power supply in an Ar gas atmosphere at a pressure of 0.13 Pa.

The recording layer was formed on $(ZrO_2)_{25}(SiO_2)_{25}(Cr_2O_3)_{50}$ with a Ge—In—Te—Sb alloy target, using a pulse-generation-type DC power supply with an output of 200 W in Ar gas atmosphere at a pressure of 0.13 Pa. The composition of Ge—In—Te—Sb alloy target was adjusted in advance such that the recording layer has a predetermined composition.

Subsequently, a layer $(ZrO_2)_{25}(SiO_2)_{25}(Cr_2O_3)_{50}$ was formed under the same sputtering conditions as described above.

Next, a method for determining a crystallization temperature is described. The quartz substrate on which the thin film including the recording layer was formed was placed on a heating stage in a measurement apparatus, and the sample was heated with a rate of temperature increase of 1° C. During heating, a transmittance was measured by irradiating the sample with red laser. When the recording layer in changed into crystal phase, the transmittance is sharply decreased, and thus, a temperature at which sharp decrease in the transmittance was observed was read off as a crystallization temperature.

The measurement of an optical change $|\Delta n|+|\Delta k|$ is described. Samples were prepared by sputtering so as to have the same constitutions as those of the samples for crystallization temperature measurement. Therefore, materials, thicknesses and condition of formation of the respective thin films are the same as those in the samples for crystallization temperature measurement. Here, only forms and functions specific to the samples for optical change measurement are described. A quartz substrate of 18 mm long, 12 mm wide and 1 mm thickness was used as a substrate.

As described above, $|\Delta n|+|\Delta k|$ is defined as a difference between a complex refractive index in crystal phase (nc-ikc) and a complex refractive index in amorphous phase (na-ika) in the recording layer. nc is a refractive index in crystal phase, kc is an extinction coefficient in crystal phase, na is a refractive index in amorphous phase, ka is an extinction coefficient in amorphous phase, $\Delta n = nc-na$ and $\Delta k = kc-ka$.

The recording layer is required to be subjected to heat treatment to change into crystal phase in order that nc and kc in crystal phase are measured, since the recording layer formed by sputtering is in amorphous phase. Conditions for the heat treatment are described. The quartz substrate on which the thin film including the recording layer was formed was placed in an electric furnace; air was once exhausted and then, nitrogen was introduced; the sample was held at a temperature about 10° C. higher than the crystallization temperature measured previously, for about 10 minutes in a nitrogen gas atmosphere, and then, the sample was cooled naturally to the room temperature. The heat treatment temperatures for the respective samples were set depending on the crystallization temperatures. During this crystallization operation, $(ZrO_2)_{25}(SiO_2)_{25}(Cr_2O_3)_{50}$ on the both sides of the recording layer fulfilled function of preventing the oxidation of the recording layer.

A method for measuring an optical change is described. The optical change is calculated as follows: nc and kc in crystal phase and na and ka in amorphous phase when being irradiated with laser beam having a wavelength of 405 nm are measured by use of ellipsometry, and then, $|\Delta n|+|\Delta k|$ is calculated from $\Delta n$ and $\Delta k$.

The relations between the values of y and the optical changes $|\Delta n|+|\Delta k|$ as well as the crystallization temperatures are shown in Table 1 with respect to the recording layers in the respective samples. The compositions of the recording layers are indicated by both units, mol % and atomic % (at %).

TABLE 1

| Sample Number | | Recording Layer Composition (mol %) $[(Ge_{0.5}Te_{0.5})_{0.9}(In_{0.4}Te_{0.6})_{0.1}]_y Sb_{100-y}$ | Recording Layer Composition (at %) | | | | | Optical Change | Crystallization Temperature | |
|---|---|---|---|---|---|---|---|---|---|---|
| | | | Ge | In | Te | Sb | Bi | $|\Delta n| + |\Delta k|$ | (°C.) | Judgment |
| Example | 1-1 | $[(Ge_{0.5}Te_{0.5})_{0.9}(In_{0.4}Te_{0.6})_{0.1}]_{99.5}Sb_{0.5}$ | 44.8 | 4.0 | 50.7 | 0.5 | 0.0 | 2.70 | 231 | + |
| | 1-2 | $[(Ge_{0.5}Te_{0.5})_{0.9}(In_{0.4}Te_{0.6})_{0.1}]_{99.0}Sb_{1.0}$ | 44.6 | 4.0 | 50.4 | 1.0 | 0.0 | 2.75 | 234 | + |
| | 1-3 | $[(Ge_{0.5}Te_{0.5})_{0.9}(In_{0.4}Te_{0.6})_{0.1}]_{98.0}Sb_{2.0}$ | 44.1 | 3.9 | 50.0 | 2.0 | 0.0 | 2.80 | 240 | + |
| | 1-4 | $[(Ge_{0.5}Te_{0.5})_{0.9}(In_{0.4}Te_{0.6})_{0.1}]_{97.0}Sb_{3.0}$ | 43.7 | 3.9 | 49.4 | 3.0 | 0.0 | 2.70 | 246 | + |
| | 1-5 | $[(Ge_{0.5}Te_{0.5})_{0.9}(In_{0.4}Te_{0.6})_{0.1}]_{96.0}Sb_{4.0}$ | 43.2 | 3.8 | 49.0 | 4.0 | 0.0 | 2.65 | 252 | + |
| | 1-6 | $[(Ge_{0.5}Te_{0.5})_{0.9}(In_{0.4}Te_{0.6})_{0.1}]_{95.0}Sb_{5.0}$ | 42.8 | 3.8 | 48.4 | 5.0 | 0.0 | 2.60 | 258 | + |
| Comparative Example | A-1 | $[(Ge_{0.5}Te_{0.5})_{0.9}(In_{0.4}Te_{0.6})_{0.1}]_{94.0}Sb_{6.0}$ | 42.3 | 3.8 | 47.9 | 6.0 | 0.0 | 2.45 | 264 | ± |
| | A-2 | $[(Ge_{0.5}Te_{0.5})_{0.9}(In_{0.4}Te_{0.6})_{0.1}]_{100}$ | 45.0 | 4.0 | 51.0 | 0.0 | 0.0 | 2.42 | 228 | ± |
| | A-3 | $[(Ge_{0.5}Te_{0.5})_{0.9}(Sb_{0.4}Te_{0.6})_{0.1}]_{100}$ | 45.0 | 0.0 | 51.0 | 4.0 | 0.0 | 2.20 | 220 | ± |
| | A-4 | $[(Ge_{0.5}Te_{0.5})_{0.9}(Bi_{0.4}Te_{0.6})_{0.1}]_{100}$ | 45.0 | 0.0 | 51.0 | 0.0 | 4.0 | 1.90 | 180 | − |

Judgments of "+", "±" and "−" in the table are described. "+" indicates that the optical change $|\Delta n|+|\Delta k|$ is 2.5 or more and that the crystallization temperature is 230° C. or more; "±" indicates that $|\Delta n|+|\Delta k|$ is 2.0 or more and less than 2.5 or that the crystallization temperature is 200° C. or more and less than 230° C.; "−" indicates that $|\Delta n|+|\Delta k|$ is less than 2.0 or that the crystallization temperature is less than 200° C.

When the optical change ($|\Delta n|+|\Delta k|$) is 2.5 or more, practical signal amplitude can be obtained so that the information recording medium having excellent signal quality can be manufactured. When the optical change is less than 2.5, it is inferior in signal quality. Particularly, when the optical change is less than 2.0, practical signal quality cannot be obtained. In addition, when the crystallization temperature is 230° C. or more, practical stability of amorphous phase can be obtained so that the information recording medium having high reliability can be manufactured. When the crystallization temperature of the recording layer is less than 230° C., the amorphous phase is inferior in stability. Particularly, when the crystallization temperature is less than 200° C., practical reliability cannot be obtained.

As a result, it was found that the judgment was "+" in the case of y=95.0 to 99.5 and that the composition of the formula (1) wherein y=95.0 to 99.5 was preferable. Further, it was also found that $|\Delta n|+|\Delta k|$ was 2.7 or more in the case of y=97.0 to 99.5 and that the composition of the formula (1) wherein y=97.0 to 99.5 was more preferable.

Sample A-1 includes the recording layer satisfying y=94.0 in the formula (1) and containing 6 mol % of Sb, but it has low $|\Delta n|+|\Delta k|$. Therefore, it can be said that 95≤y is preferable. In addition, Sample A-2 includes the recording layer satisfying y=100 in the formula (1), but it has a crystallization temperature lower than 230° C. Therefore, 95≤y<100 is preferable.

Sample A-3 includes a recording layer having a composition in which Sb is used in place of In, and Sample A-4 includes a recording layer having a composition in which Bi is used in place of In. Any of the samples has low crystallization temperature. In addition, Sample A-4 has lower optical change $|\Delta n|+|\Delta k|$.

From the results of the present example, it was found that the material for the recording layer preferably has a composition satisfying 95≤y<100 in the formula (1) $[(Ge_{0.5}Te_{0.5})_x (In_{0.4}Te_{0.6})_{1-x}]_y Sb_{100-y}$.

EXAMPLE 2

In Example 2, the information recording medium 100 shown in FIG. 1 was manufactured, the average diameter of the crystal particles in the recording layer 35 of the third information layer 30 was measured, and the noise level was measured in an evaluation apparatus in order to examine effects of the nucleation layer 38 consisting of a material represented by the formula (2) $(Ge_{0.5}Te_{0.5})_z(Bi_{0.4}Te_{0.6})_{100-z}$.

EXPERIMENT 1

The present Example is described specifically. First, a method for manufacturing an information recording medium 100 is described. In the first experiment in Example 2, an information recording medium 100 in which the nucleation layer 38 was located on a side of the recording layer 35, which side was opposite to the laser beam 5 incident side, was manufactured.

The materials and thicknesses of the respective layers are described. A polycarbonate substrate (diameter: 120 mm, thickness: 1.1 mm) on which guide groove (depth: 20 nm, distance between grooves: 0.32 μm) were formed was prepared as a substrate 1, and attached to the sputtering apparatus.

A $Bi_2Ti_2O_7$ (($Bi_2O_3)_{33.3}(TiO_2)_{66.7}$) layer having a thickness of 10 nm as a dielectric layer 11, an Ag—Ga—Cu alloy layer having a thickness of 100 nm as a reflective layer 12, a $(ZrO_2)_{25}(SiO_2)_{25}(In_2O_3)_{50}$ layer having a thickness of 12 nm as a dielectric layer 13, a $(ZrO_2)_{35}(SiO_2)_{35}(Cr_2O_3)_{30}$ layer having a thickness of 5 nm as an interface layer 14, a $(Ge_{0.5}Te_{0.5})_{29}(Bi_{0.4}Te_{0.6})_{71}$ layer having a thickness of 1 nm as a nucleation layer 18, a $[(Ge_{0.5}Te_{0.5})_{0.9}(In_{0.4}Te_{0.6})_{0.1}]_{99.5}Sb_{0.5}$ layer having a thickness of 10 nm as a recording layer 15, a $(ZrO_2)_{35}(SiO_2)_{35}(Cr_2O_3)_{30}$ layer having a thickness of 5 nm as an interface layer 16, a $(ZnS)_{80}(SiO_2)_{20}$ layer having a thickness of 70 nm as a dielectric layer 17 were laminated in this order on the surface of the substrate 1 with the guide groove formed therein. The first information layer 10 was formed in this way.

Next, the intermediate layer 3 having guide groove was formed on the surface of the dielectric layer 17 so as to have a thickness of 25 μm. A $Bi_2Ti_2O_7$ layer having a thickness of 18 nm as a dielectric layer 21, an Ag—Pd—Cu alloy layer having a thickness of 10 nm as a reflective layer 22, a $(ZrO_2)_{40}(SiO_2)_{40}(Cr_2O_3)_{20}$ layer having a thickness of 7 nm as a dielectric layer 23, a $(ZrO_2)_{25}(SiO_2)_{25}(Cr_2O_3)_{50}$ layer having a thickness of 5 nm as an interface layer 24, a $(Ge_{0.5}Te_{0.5})_{29}(Bi_{0.4}Te_{0.6})_{71}$ layer having a thickness of 0.8 nm as a nucleation layer 28, a $[(Ge_{0.5}Te_{0.5})_{0.9}(In_{0.4}Te_{0.6})_{0.1}]_{99.5}Sb_{0.5}$ layer having a thickness of 7 nm as a recording layer 25, a $(ZrO_2)_{25}(SiO_2)_{25}(Cr_2O_3)_{50}$ layer having a thickness of 5 nm as an interface layer 26, a $(ZnS)_{80}(SiO_2)_{20}$ layer having a thickness of 40 nm as a dielectric layer 27 were laminated in this order on the surface of the intermediate layer 3 with the guide groove formed therein. The second information layer 20 was formed in this way.

Next, the intermediate layer 4 having guide groove was formed on the surface of the dielectric layer 27 so as to have a thickness of 18 μm. A $Bi_2Ti_2O_7$ layer having a thickness of 18 nm as a dielectric layer 31, an Ag—Pd—Cu alloy layer having a thickness of 8 nm as a reflective layer 32, a $(ZrO_2)_{40}(SiO_2)_{40}(Cr_2O_3)_{20}$ layer having a thickness of 7 nm as a dielectric layer 33, a $(ZrO_2)_{25}(SiO_2)_{25}(Cr_2O_3)_{50}$ layer having a thickness of 5 nm as an interface layer 34, the nucleation layer 38 having a thickness of 0.8 nm, a $[(Ge_{0.5}Te_{0.5})_{0.9}(In_{0.4}Te_{0.6})_{0.1}]_{99.5}Sb_{0.5}$ layer having a thickness of 6 nm as a recording layer 35, a $(ZrO_2)_{25}(SiO_2)_{25}(Cr_2O_3)_{50}$ layer having a thickness of 5 nm as an interface layer 36, a $(ZnS)_{80}(SiO_2)_{20}$ layer having a thickness of 40 nm as a dielectric layer 37 were laminated in this order on the surface of the intermediate layer 4 with the guide groove formed therein. The third information layer 30 was formed in this way.

Here, sputtering conditions for the respective layers are described. All of the target used were round-shaped and have a diameter of 200 mm and a thickness of 6 mm.

The dielectric layers 11, 21 and 31 were formed by sputtering a $Bi_2Ti_2O_7$ target by use of a radio-frequency power source with an output of 2 kW in a mixed gas atmosphere at a pressure of 0.13 Pa in which a volume ratio of Ar gas to $O_2$ gas was 97:3.

The reflective layer 12 was formed by sputtering an Ag—Ga—Cu alloy target by use of a direct-current power supply with an output of 2 kW in an Ar gas atmosphere at a pressure of 0.2 Pa. The reflective layers 22 and 32 were formed by sputtering an Ag—Pd—Cu alloy target by use of a direct-current power supply with an output of 200 W in an Ar gas atmosphere at a pressure of 0.2 Pa.

The dielectric layer 13 was formed by sputtering a $(ZrO_2)_{25}(SiO_2)_{25}(In_2O_3)_{50}$ target by use of a radio-frequency power supply with an output of 3 kW in an Ar gas atmosphere at a pressure of 0.13 Pa. The dielectric layers 23 and 33 were formed by sputtering a $(ZrO_2)_{40}(SiO_2)_{40}(Cr_2O_3)_{20}$ target by use of a radio-frequency power supply with an output of 3 kW in an Ar gas atmosphere at a pressure of 0.13 Pa.

The interface layers 14 and 16 were formed by sputtering a $(ZrO_2)_{35}(SiO_2)_{35}(Cr_2O_3)_{30}$ target by use of a radio-frequency power supply with an output of 3 kW in an Ar gas atmosphere at a pressure of 0.13 Pa. The interface layers 24, 26, 34 and 36 were formed by sputtering a $(ZrO_2)_{25}(SiO_2)_{25}(Cr_2O_3)_{50}$ target by use of a radio-frequency power supply with an output of 3 kW in an Ar gas atmosphere at a pressure of 0.13 Pa.

The nucleation layers 18, 28 and 38 were formed by sputtering a Ge—Bi—Te alloy target by use of a pulse generation-type DC power supply with an output of 50 W in an Ar gas atmosphere at a pressure of 0.13 Pa. The formations of the nucleation layers 38 were carried out by use of Ge—Bi—Te alloy targets having different compositions such that the nucleation layers 38 of Samples 2-1 to 2-6 have compositions shown in Table 2, respectively.

The recording layer 15 was formed by sputtering a Ge—In—Te—Sb alloy target by use of a pulse generation-type DC power supply with an output of 200 W in an Ar gas atmosphere at a pressure of 0.13 Pa. The recording layers 25 and 35 were formed by sputtering a Ge—In—Te—Sb alloy target by use of a pulse generation-type DC power supply with an output of 100 W in an Ar gas atmosphere at a pressure of 0.13 Pa.

The dielectric layers 17, 27 and 37 were formed by sputtering a $(ZnS)_{80}(SiO_2)_{20}$ target by use of a radio-frequency power supply with an output of 2.5 kW in an Ar gas atmosphere at a pressure of 0.13 Pa.

The intermediate layer 3 was formed by the following procedures. First, an ultraviolet-curing resin was applied by means of spin coating on the surface of the dielectric layer 17. Next, a polycarbonate plate having concavities and convexities (depth: 20 nm, distance between grooves: 0.32 μm) complementary to the guide groove to be formed in the intermediate layer 3 was laminated on the ultraviolet-curing resin such that the concavo-convex side of the substrate was brought into contact with the ultraviolet-curing resin. Irradiation with ultraviolet rays was carried out in that state to cure the resin, and then, the polycarbonate plate having concavities and convexities was removed. As a result, the guide groove was formed in the intermediate layer 3. Guide groove having the same shape as that of the substrate 1 was formed in the intermediate layer 3. The intermediate layer 4 was also formed on the surface of the dielectric layer 27 by the same procedures.

The substrate 1 in which the third information layer 30 was formed on the intermediate layer 4 as described above was taken from the sputtering apparatus. Then, the ultraviolet-curing resin was applied on the surface of the dielectric layer 37 by spin coating method so as to have a thickness of 57 μm, and the resin was irradiated with ultraviolet rays to cure, whereby the transparent layer 2 was formed.

Initialization was carried out after forming the transparent layer 2. The recording layers 15, 25 and 35 in the information recording medium 100 were crystallized over almost the whole area within a circular region of from 22 to 60 mm in radius by use of semiconductor laser with a wavelength of 810 nm.

Samples 2-1 to 2-6 in which the compositions of the nucleation layers 38 in the third information layers 30 were different from each other were manufactured. The nucleation layers 38 had the compositions with z=10 in Sample 2-1, z=22 in Sample 2-2, z=29 in Sample 2-3, z=44 in Sample 2-4, z=62 in Sample 2-5, z=71 in Sample 2-6 (z is z in the formula (2)). One sample for noise level evaluation and one sample for crystal particle diameter measurement were prepared for each composition.

An evaluation apparatus wherein a semiconductor laser with a wavelength of 405 nm and an objective lens with a numerical aperture of 0.85 were mounted in an optical system, was used for noise level evaluation of the third information layer 30 in the information recording medium 100. Noise level (dBm) at 2 MHz was measured by a spectrum analyzer, while rotating the information recording medium 100 with a linear velocity of 7.4 m/sec and irradiating the third information layer 30 with laser beam 5 of 1.0 mW. Noise level was evaluated by performing a reproduction in the recording layer in which no signal is recorded.

The measurement of an average diameter of crystal particles in the recording layer 35 of the third information layer 30 is described. Cross section of a thin film of the information recording medium 100 was cut out, and the cross-section was sliced into a thin piece by a focused ion beam (FIB) method. The cross-section was observed by a transmission electron microscope (TEM), and diameters of approximately 10 crystal particles in the recording layer 35 were measured from the observed image. An average was calculated from the measured values.

Relations between an average diameter of the crystal particles in the recording layer 35 as well as a noise level at 2 MHz and a composition of the nucleation layer 38 are shown in Table 2-1.

TABLE 2-1

Arrangement: Interface Layer 34/Nucleation Layer 38/Recording Layer 35/Interface Layer 36

| Sample Number | | Nucleation Layer 38 Composition (mol %) $(Ge_{0.5}Te_{0.5})_z(Bi_{0.4}Te_{0.6})_{100-z}$ | Average Crystal Particle Diameter in Recording Layer 35 (nm) | Noise Level @ 2 MHz (dBm) | Judgment |
|---|---|---|---|---|---|
| Example | 2-1 | $(Ge_{0.5}Te_{0.5})_{10}(Bi_{0.4}Te_{0.6})_{90}$ | 20 | −74.1 | ++ |
| | 2-2 | $(Ge_{0.5}Te_{0.5})_{22}(Bi_{0.4}Te_{0.6})_{78}$ | 14 | −74.3 | ++ |
| | 2-3 | $(Ge_{0.5}Te_{0.5})_{29}(Bi_{0.4}Te_{0.6})_{71}$ | 16 | −74.1 | ++ |
| | 2-4 | $(Ge_{0.5}Te_{0.5})_{44}(Bi_{0.4}Te_{0.6})_{56}$ | 28 | −73.8 | ++ |
| | 2-5 | $(Ge_{0.5}Te_{0.5})_{62}(Bi_{0.4}Te_{0.6})_{38}$ | 57 | −72.1 | + |
| | 2-6 | $(Ge_{0.5}Te_{0.5})_{71}(Bi_{0.4}Te_{0.6})_{29}$ | 80 | −71.5 | + |
| Comparative Example | B-1 | $(Ge_{0.5}Te_{0.5})_5(Bi_{0.4}Te_{0.6})_{95}$ | 129 | −71.0 | ± |
| | B-2 | $(Ge_{0.5}Te_{0.5})_{74}(Bi_{0.4}Te_{0.6})_{26}$ | 140 | −70.8 | ± |
| | B-3 | $Sn_{50}Te_{50}$ | 98 | −64.5 | − |
| | B-4 | Not formed | 160 | −69.4 | − |

Judgments of "++", "+", "±", "−" in the table is described. "++" indicates that the average diameter of the crystal particles is less than 50 nm and that the noise level is less than −73 dBm; "+" indicates that the average particle diameter is 50 nm or more and less than 100 nm or that the noise level is −73 dBm or more and less than −70 dBm; "+" indicates that the average diameter of the crystal particles is 100 nm or more and less than 150 nm or that the noise level is −70 dBm or more and less than −65 dBm; "−" indicates that the average diameter of the crystal particles is 150 nm or more or that the noise level is −65 dBm or more.

When the average diameter of the crystal particles is less than 50 nm, excellent repeated overwriting characteristics can be obtained. In addition, when the noise level is less than −73 dBm, excellent signal quality can be obtained. When the average diameter of the crystal particles is 50 nm or more and less than 100 nm, favorable repeated overwriting characteristics can be obtained. When the noise level is −73 dBm or more and less than −70 dBm, favorable signal quality can be obtained. When the average diameter of the crystal particles is 100 nm or more and less than 150 nm, repeated overwriting characteristics for practical use cannot be obtained. In addition, when the noise level is −70 dBm or more and less than −65 dBm, signal quality becomes a limit of error correction level. When the average diameter of the crystal particles is 150 nm or more, or when the noise level is −65 dBm or more, practical signal quality cannot be obtained.

As a result, Samples 2-1 to 2-6, that is, the samples in which the nucleation layer 38 has a composition with z=10 to 71 apparently had the reduced average diameter of the crystal particles in the recording layer 35 compared to Comparative Example B-4 having no nucleation layer 38. In particular, samples in which the nucleation layer 38 had the composition with z=10 to 44 were judged as "++" and thus, exhibited an excellent property.

It was considered that, since the nucleation layer 38 of Sample B-1 contains $(Ge_{0.5}Te_{0.5})$ in an amount of less than 10 mol %, crystal structure of rhombohedral was generated in the nucleation layer 38, and the nucleation ability of the nucleation layer 38 was reduced so that the effect of reducing a crystal particle diameter in the recording layer 35 is decreased. In addition, it is considered that, since the nucleation layer 38 of Sample B-2 contains $(Ge_{0.5}Te_{0.5})$ in the amount of more than 71 mol %, the crystallinity of the nucleation layer itself was reduced so that the nucleation ability was reduced. The nucleation layer 38 of Sample B-3 was formed of $Sn_{50}Te_{50}$ (atomic %) and had a nucleation ability allowing a crystal particle diameter to be reduced. However, Sample B-3 had a noise level which was about 7 dB higher than that of $(Ge_{0.5}Te_{0.5})_z(Bi_{0.4}Te_{0.6})_{100-z}$-based sample, and thus, this sample was impractical.

EXPERIMENT 2

Next, in the second experiment of the present Example, the information recording medium 100 was manufactured in which the nucleation layer was located at the interface of the recording layer on the laser beam 5 incident side in the third information layer 30. The substrate 1, the first information layer 10, the intermediate layer 3, the second information layer 20 and the intermediate layer 4 were formed in the same way as those in the first experiment of the present example described above.

A $Bi_2Ti_2O_7$ layer having a thickness of 18 nm as a dielectric layer 31, an Ag—Pd—Cu alloy layer having a thickness of 8 nm as a reflective layer 32, a $(ZrO_2)_{40}(SiO_2)_{40}(Cr_2O_3)_{20}$ layer having a thickness of 7 nm as a dielectric layer 33, a $(ZrO_2)_{25}(SiO_2)_{25}(Cr_2O_3)_{50}$ layer having a thickness of 5 nm as an interface layer 34, a $[(Ge_{0.5}Te_{0.5})_{0.9}(In_{0.4}Te_{0.6})_{0.1}]_{99.5}Sb_{0.5}$ layer having a thickness of 6 nm as a recording layer, the nucleation layer having a thickness of 0.8 nm, a $(ZrO_2)_{25}(SiO_2)_{25}(Cr_2O_3)_{50}$ layer having a thickness of 5 nm as an interface layer 36 and a $(ZnS)_{80}(SiO_2)_{20}$ layer having a thickness of 40 nm as a dielectric layer 37 were laminated in this order on the surface of the intermediate layer 4 with the guide groove formed therein. The third information layer 30 was formed in this way. The transparent layer 2 was formed in the same way as that in the first experiment of the present example described above. Similarly, initialization was carried out after forming the transparent layer.

Samples 2-11 to 2-16 in which the compositions of the nucleation layers in the third information layers 30 were different from each other were manufactured in this way. The nucleation layer had compositions with z=10 in Sample 2-11, z=22 in Sample 2-12, z=29 in Sample 2-13, z=44 in Sample 2-14, z=62 in Sample 2-15, and z=71 in Sample 2-16. One sample for noise level evaluation and one sample for crystal particle diameter measurement were prepared for each composition.

Evaluations were carried out for these samples in the same way as the first experiment of the present Embodiment. Results are shown in Table 2-2.

TABLE 2-2

Arrangement: Interface Layer 34/Recording
Layer/Nucleation Layer/Interface Layer 36

| Sample Number | | Nucleation Layer Composition (mol %) $(Ge_{0.5}Te_{0.5})_z(Bi_{0.4}Te_{0.6})_{100-z}$ | Average Crystal Particle Diameter in Recording Layer (nm) | Noise Level @ 2 MHz (dBm) | Judgment |
|---|---|---|---|---|---|
| Example | 2-11 | $(Ge_{0.5}Te_{0.5})_{10}(Bi_{0.4}Te_{0.6})_{90}$ | 28 | −74.0 | ++ |
| | 2-12 | $(Ge_{0.5}Te_{0.5})_{22}(Bi_{0.4}Te_{0.6})_{78}$ | 26 | −73.8 | ++ |
| | 2-13 | $(Ge_{0.5}Te_{0.5})_{29}(Bi_{0.4}Te_{0.6})_{71}$ | 31 | −73.7 | ++ |
| | 2-14 | $(Ge_{0.5}Te_{0.5})_{44}(Bi_{0.4}Te_{0.6})_{56}$ | 40 | −73.1 | ++ |
| | 2-15 | $(Ge_{0.5}Te_{0.5})_{62}(Bi_{0.4}Te_{0.6})_{38}$ | 72 | −72.1 | + |
| | 2-16 | $(Ge_{0.5}Te_{0.5})_{71}(Bi_{0.4}Te_{0.6})_{29}$ | 97 | −71.5 | + |

It was found that the nucleation layer had an effect of reducing the crystal particle diameter in the recording layer even if the nucleation layer was provided on the light incident side of laser beam 5. In particular, samples in which the nucleation layer had a composition with z=10 to 44 were judged as "++" and thus, exhibited excellent properties.

EXPERIMENT 3

Next, the information recording medium 100 in which the nucleation layers were located on both sides of the recording layer were manufactured as a third experiment in Example 2.

The substrate 1, the first information layer 10, the intermediate layer 3, the second information layer 20 and the intermediate layer 4 were formed in the same way as that in the first experiment of the present example described above.

A $Bi_2Ti_2O_7$ layer having a thickness of 18 nm as a dielectric layer 31, an Ag—Pd—Cu alloy having a thickness of 8 nm as a reflective layer 32, a $(ZrO_2)_{40}(SiO_2)_{40}(Cr_2O_3)_{20}$ layer having a thickness of 7 nm as a dielectric layer 33, a $(ZrO_2)_{25}(SiO_2)_{25}(Cr_2O_3)_{50}$ layer having a thickness of 5 nm as an interface layer 34, the nucleation layer having a thickness of 0.8 nm, a $[(Ge_{0.5}Te_{0.5})_{0.9}(In_{0.4}Te_{0.6})_{0.1}]_{99.5}Sb_{0.5}$ layer having a thickness of 6 nm as a recording layer, the nucleation layer having a thickness of 0.8 nm, a $(ZrO_2)_{25}(SiO_2)_{25}(Cr_2O_3)_{50}$ layer of 5 nm as an interface layer 36, a $(ZnS)_{80}(SiO_2)_{20}$ layer having a thickness of 40 nm as a dielectric layer 37 were laminated in this order on the surface of the intermediate layer 4 with the guide groove formed therein. Thus, the third information layer 30 was formed. The transparent layer 2 was formed in the same way as that in the first experiment of the present example described above. Similarly, the initialization was carried our after forming the transparent layer 2.

Samples 2-21 to 2-26 in which the compositions of the nucleation layers in the third information layers 30 were different from each other were manufactured in this way. The nucleation layer had compositions with z=10 in Sample Number 2-21, z=22 in Sample Number 2-22, z=29 in Sample Number 2-23, z=44 in Sample Number 2-24, z=62 in Sample Number 2-25, z=71 in Sample Number 2-26. One sample for noise level evaluation and one sample for crystal particle diameter measurement were prepared for each composition.

Evaluations were carried out for these samples in the same way as the first experiment of the present example. Results are shown in Table 2-3.

TABLE 2-3

Arrangement: Interface Layer 34/Nucleation
Layer/Recording Layer/Nucleation Layer/Interface Layer 36

| Sample Number | | Nucleation Layer Composition (mol %) $(Ge_{0.5}Te_{0.5})_z(Bi_{0.4}Te_{0.6})_{100-z}$ | Average Crystal Particle Diameter in Recording Layer (nm) | Noise Level @ 2 MHz (dBm) | Judgment |
|---|---|---|---|---|---|
| Example | 2-21 | $(Ge_{0.5}Te_{0.5})_{10}(Bi_{0.4}Te_{0.6})_{90}$ | 15 | −74.3 | ++ |
| | 2-22 | $(Ge_{0.5}Te_{0.5})_{22}(Bi_{0.4}Te_{0.6})_{78}$ | 10 | −74.8 | ++ |
| | 2-23 | $(Ge_{0.5}Te_{0.5})_{29}(Bi_{0.4}Te_{0.6})_{71}$ | 12 | −74.5 | ++ |
| | 2-24 | $(Ge_{0.5}Te_{0.5})_{44}(Bi_{0.4}Te_{0.6})_{56}$ | 23 | −74.0 | ++ |
| | 2-25 | $(Ge_{0.5}Te_{0.5})_{62}(Bi_{0.4}Te_{0.6})_{38}$ | 52 | −72.1 | + |
| | 2-26 | $(Ge_{0.5}Te_{0.5})_{71}(Bi_{0.4}Te_{0.6})_{29}$ | 74 | −71.5 | + |

It was found that the effect of reducing the crystal particle diameter in the recording layer was more significant when the nucleation layers were provided on both sides of the recording layer. In particular, samples in which the nucleation layer had the composition with z=10 to 44 were judged as "++" and thus, exhibit an excellent property.

From the results of the present example, it was found that, when the recording layer was formed of a material represented by the formula (1) $[(Ge_{0.5}Te_{0.5})_x(In_{0.4}Te_{0.6})_{1-x}]_y$ $Sb_{100-y}$, the nucleation layer in contact with the recording layer is indispensable, and that the nucleation layer was preferably formed of a material represented by the formula (2) $(Ge_{0.5}Te_{0.5})_z(Bi_{0.4}Te_{0.6})_{100-z}$ satisfying z=10 to 71, more preferably satisfying z=10 to 44. In addition, it was also found that the noise level can be reduced as long as the nucleation layer was in contact with at least one side of the recording layer. It is preferable to provide the nucleation layer between the recording layer 35 and the interface layer 34 when the nucleation layer is provided on only one side of the recording layer. This is because greater effect can be obtained. It can be selected which side of the recording layer the nucleation layer(s) is provided on, depending on the recording and reproduction conditions and the reliability evaluation conditions of the information recording medium 100 as well as the conditions of manufacturing facility. When the nucleation layers are provided on both sides of the recording layer, the nucleation layers on the both sides may have the same composition, or have different compositions. In any cases, excellent effect can be obtained when the material for the nucleation layer is selected form materials which is represented by the formula (2) and satisfies z=10 to 71.

EXAMPLE 3

In Example 3, the relation between the value of x and erasing characteristics was examined for the recording layer 35 consisting of a material represented by $[(Ge_{0.5}Te_{0.5})_x(In_{0.4}Te_{0.6})_{1-x}]_y Sb_{100-y}$.

The present example is described in detail. First, a method for manufacturing an information recording medium 100 is described. The substrate 1, the first information layer 10, the intermediate layer 3, the second information layer 20 and the intermediate layer 4 were formed in the same way as those in the first experiment of Example 2.

A $Bi_2Ti_2O_7$ layer having a thickness of 18 nm as a dielectric layer 31, an Ag—Pd—Cu alloy layer having a thickness of 8 nm as a reflective layer 32, a $(ZrO_2)_{40}(SiO_2)_{40}(Cr_2O_3)_{20}$ layer having a thickness of 7 nm as a dielectric layer 33, a $(ZrO_2)_{25}(SiO_2)_{25}(Cr_2O_3)_{50}$ layer having a thickness of 5 nm as an interface layer 34, a $(Ge_{0.5}Te_{0.5})_{29}(Bi_{0.4}Te_{0.6})_{71}$ layer having a thickness of 0.8 nm as a nucleation layer 38, the recording layer 35 having a thickness of 6 nm, a $(ZrO_2)_{25}(SiO_2)_{25}(Cr_2O_3)_{50}$ layer having a thickness of 5 nm as an interface layer 36, a $(ZnS)_{80}(SiO_2)_{20}$ layer having a thickness of 40 nm as a dielectric layer 37 were laminated in this order on the surface of the intermediate layer 4 with the guide groove formed therein. The third information layer 30 was formed in this way. The transparent layer 2 was formed in the same way as that in the first experiment of Example 2 described above. Similarly, the initialization was carried out after forming the transparent layer 2. The sputtering conditions for the respective layers are the same as those employed in the first experiment of Example 2.

Samples 3-1 to 3-6 in which the compositions of the recording layers 35 of the third information layers 30 were different, were formed in this way. The recording layers 35 in all samples of the present example have compositions represented by the formula (1), wherein y is 99.5 and x is 0.800 in Sample 3-1, 0.850 in Sample 3-2, 0.900 in Sample 3-3, 0.925 in Sample 3-4, 0.950 in Sample 3-5 and 0.975 in Sample 3-6.

A method for evaluating erasing characteristics is described. First, a method for measuring signal amplitude-to-noise ratio (CNR) is described. Optical system of the evaluation apparatus and linear velocity of the information recording medium are the same as those in Example 2. The laser beam 5 is applied to the information recording medium 100 with modulating power between a recording power (mW) of high power level and an erasing power (mW) of low power level, and single signals of 3T (mark length: 0.168 μm) and single signals of 8T (mark length: 0.446 μm) are alternately recorded on the groove surface in a total of 11 times. The recording power and the erasing power were optimized for the third information layer 30 of the respective samples according to the predetermined procedures. The recording power was 12.7 mW to 13.3 mW, and the erasing power was 4.1 mW to 4.3 mW. Waveform of the recorded pulse is multi pulse. Amplitude (C) (dBm) and noise (N) (dBm) were measured by a spectrum analyzer when the eleventh 3T signal is recorded, and CNR (dB) is determined from the difference.

Next, a method for measuring an erase rate is described. 8T signal is recorded as a 12th signal after measuring the amplitude of the eleventh 3T signal described above. Then, the amplitude of 3T signal is again measured, and an attenuation amount of 3T signal is determined. This attenuation amount is defined as an erase rate (dB). Results of the evaluation of 3T CNR and 3T erase rate are shown in Table 3.

TABLE 3

| Sample Number | | Recording Layer 35 Composition (mol %) $[(Ge_{0.5}Te_{0.5})_x(In_{0.4}Te_{0.6})_{1-x}]_{99.5}Sb_{0.5}$ | Recording Layer 35 Composition (at %) | | | | 3T CNR (dB) | 3T Erase Rate (dB) | Judgment |
|---|---|---|---|---|---|---|---|---|---|
| | | | Ge | In | Te | Sb | | | |
| Example | 3-1 | $[(Ge_{0.5}Te_{0.5})_{0.800}(In_{0.4}Te_{0.6})_{0.200}]_{99.5}Sb_{0.5}$ | 39.8 | 8.0 | 51.7 | 0.5 | 51.5 | 33.6 | + |
| | 3-2 | $[(Ge_{0.5}Te_{0.5})_{0.850}(In_{0.4}Te_{0.6})_{0.150}]_{99.5}Sb_{0.5}$ | 42.3 | 6.0 | 51.2 | 0.5 | 52.7 | 33.0 | + |
| | 3-3 | $[(Ge_{0.5}Te_{0.5})_{0.900}(In_{0.4}Te_{0.6})_{0.100}]_{99.5}Sb_{0.5}$ | 44.8 | 4.0 | 50.7 | 0.5 | 53.3 | 31.8 | ++ |
| | 3-4 | $[(Ge_{0.5}Te_{0.5})_{0.925}(In_{0.4}Te_{0.6})_{0.075}]_{99.5}Sb_{0.5}$ | 46.0 | 3.0 | 50.5 | 0.5 | 53.5 | 31.0 | ++ |
| | 3-5 | $[(Ge_{0.5}Te_{0.5})_{0.950}(In_{0.4}Te_{0.6})_{0.050}]_{99.5}Sb_{0.5}$ | 47.3 | 2.0 | 50.2 | 0.5 | 53.8 | 30.4 | ++ |
| | 3-6 | $[(Ge_{0.5}Te_{0.5})_{0.975}(In_{0.4}Te_{0.6})_{0.025}]_{99.5}Sb_{0.5}$ | 48.5 | 1.0 | 50.0 | 0.5 | 54.5 | 28.0 | + |
| Comparative Example | C-1 | $[(Ge_{0.5}Te_{0.5})_{0.750}(In_{0.4}Te_{0.6})_{0.250}]_{99.5}Sb_{0.5}$ | 37.3 | 10.0 | 52.2 | 0.5 | 49.3 | 34.8 | ± |
| | C-2 | $[(Ge_{0.5}Te_{0.5})_{1.0}]_{100}$ | 50.0 | 0.0 | 50.0 | 0.0 | 55.0 | 8.4 | − |

Judgments "++", "+", "±" and "−" in the table are described. "++" indicates that 3T CNR is 53 dB or more and that 3T erase rate is 30 dB or more; "+" indicates that 3T CNR is 50 dB or more and less than 53 dB or that 3T erase rate is 25 dB or more and less than 30 dB; "+" indicates that 3T CNR is 45 dB or more and less than 50 dB or that 3T erase rate is 20 dB or more and less than 25 dB; "−" indicates that 3T CNR is less than 45 dB or that 3T erase rate is less than 20.

When 3T CNR is 53 dB or more and 3T erase rate is 30 dB or more, excellent signal quality can be obtained. When 3T CNR is 50 dB or more and less than 53 dB or 3T erase rate is 25 dB or more and less than 30 dB, good signal quality can be obtained. When 3T CNR is 45 dB or more and less than 50 dB or 3T erase rate is 20 dB or more and less than 25 dB, signal quality becomes a limit of error correction level. When 3T CNR is less than 45 dB or 3T erase rate is less than 20 dB, practical signal quality cannot be obtained.

As a result, Samples 3-1 to 3-6, that is, samples in which the recording layer 35 had a composition with x=0.800 to 0.975 apparently had higher 3T CNR compared to Sample C-1 with x=0.750. In particular, samples in which the recording layer 35 had a composition with x=0.900 to 0.950 were judged as "++" and thus, exhibited an excellent property. Effective Rcg of Samples 3-1 to 3-6 was about 2.60%, and effective Rag was about 0.4%. In addition, Samples 3-1 to 3-6 exhibited apparently higher 3T erase rate compared to Sample C-2 with x=1.0.

High erase rate was obtained in Sample C-1 since the recording layer in Sample C-1 has a composition with x less than 0.8, that is, a composition with a small amount of $Ge_{0.5}Te_{0.5}$; however, the optical change was small. As a result, the amplitude of the reproduction signal was insufficient, and CNR was low. Sample C-2 had a recording layer in which x is 1.0, that is, a recording layer consisting only of $Ge_{0.5}Te_{0.5}$. This sample exhibited sufficiently large optical change and gave large CNR, but the crystallization speed of the recording layer was low, resulting in erase rate of less than 10 dB.

From the results of the present example, it was found that, when the composition of the recording layer 35 in the third information layer 30 was represented by the formula (1) $[(Ge_{0.5}Te_{0.5})_x(In_{0.4}Te_{0.6})_{1-x}]_y Sb_{100-y}$, $0.8 \leq x < 1.0$ was preferable and $0.9 \leq x \leq 0.95$ was more preferable. In addition, it can be said that $0.8 \leq x < 1.0$ and $95 \leq y < 100$ are preferable from the results of the present example and Example 1.

EXAMPLE 4

In Example 4, the relations of the thickness of the nucleation layer 38 to the erasing characteristics, transmittance and reflectance were examined using the recording layer 35 represented by $[(Ge_{0.5}Te_{0.5})_{0.925}(In_{0.4}Te_{0.6})_{0.075}]_{99.5}Sb_{0.5}$ and the nucleation layer 38 represented by $(Ge_{0.5}Te_{0.5})_{29}(Bi_{0.4}Te_{0.6})_{71}$.

The present example is specifically described below. First, a method for manufacturing the information recording medium 100 is described. The substrate 1, the first information layer 10, the intermediate layer 3, the second information layer 20 and the intermediate layer 4 were formed in the same way as those in the first experiment of Example 2.

A $Bi_2Ti_2O_7$ layer having a thickness of 18 nm as a dielectric layer 31, an Ag—Pd—Cu alloy layer as a reflective layer 32, a $(ZrO_2)_{40}(SiO_2)_{40}(Cr_2O_3)_{20}$ layer having a thickness of 7 nm as a dielectric layer 33, a $(ZrO_2)_{25}(SiO_2)_{25}(Cr_2O_3)_{50}$ layer having a thickness of 5 nm as an interface layer 34, a $(Ge_{0.5}Te_{0.5})_{29}(Bi_{0.4}Te_{0.6})_{71}$ layer as the nucleation layer 38, a $[(Ge_{0.5}Te_{0.5})_{0.925}(In_{0.4}Te_{0.6})_{0.075}]_{99.5}Sb_{0.5}$ layer having a thickness of 6 nm as a recording layer 35, a $(ZrO_2)_{25}(SiO_2)_{25}(Cr_2O_3)_{50}$ layer having a thickness of 5 nm as an interface layer 36, a $(ZnS)_{80}(SiO_2)_{20}$ layer having a thickness of 40 nm as a dielectric layer 37 were laminated in this order on the surface of the intermediate layer 4 with the guide groove formed therein. Thus, the third information layer 30 was formed.

Samples 4-1 to 4-5 in which the thicknesses of the nucleation layers 38 in the third information layers 30 were different were optically designed to exhibit an effective Rcg of around 2.60%, and the thicknesses of the reflective layer 32 were adjusted in accordance with the design. Specifically, the thicknesses of the reflective layer 32 and the nucleation layer 38 were 9.6 nm and 0.1 nm in Sample 4-1, 8.8 nm and 0.5 nm in Sample 4-2, 7.7 nm and 1 nm in Sample 4-3, 6.4 nm and 1.5 nm in Sample 4-4, 4.8 nm and 2.0 nm in Sample 4-5.

Subsequently, the transparent layer 2 was formed in the same way as that in the first experiment of Example 2. Similarly, the initialization was carried out after forming the transparent layer 2. Sputtering conditions for the respective layers were the same as those employed in the first experiment of Example 2.

The reflectance and the transmittance of the third information layer 30 were measured by preparing a medium for measurement in which the third information layer 30 and the transparent layer 2 were formed on the substrate 1 (the substrate having not only groove portion but also mirror portion). The initialization was carried out only on half-plane. Transmittance was measured for a light with a wavelength of 405 nm using a spectrophotometer. As the transmittance, average values of Tc (transmittance of the information layer when the recording layer is in crystal phase) and Ta (transmittance of the information layer when the recording layer is in amorphous phase) were indicated.

Effective Rcg and effective Rag were measured on the groove portion of the initialized region by use of an apparatus for recording and reproduction evaluation having the same optical system as that of Example 2.

3T CNR and 3T erase rate were evaluated by use of a sample manufactured as an information recording medium with three-layered structure according to the method described in Example 3. Recording power was from 12.7 mW to 13.3 mW, and erasing power was from 4.1 mW to 4.3 mW when 3T CNR and 3T erase rate were evaluated.

The relations of the thickness of the nucleation layer 38 to 3T CNR, 3T erase rate, average transmittance, and reflectance (effective Rcg) are shown in Table 4.

TABLE 4

| Sample Number | | Thickness of Nucleation Layer 38 (nm) | 3T CNR (dB) | 3T Erase Rate (dB) | Transmittance (%) | Reflectance (%) | Judgment |
|---|---|---|---|---|---|---|---|
| Example | 4-1 | 0.1 | 53.6 | 26.5 | 56.4 | 2.62 | + |
| | 4-2 | 0.5 | 53.2 | 30.0 | 56.2 | 2.59 | ++ |
| | 4-3 | 1 | 53.0 | 30.8 | 56.0 | 2.59 | ++ |
| | 4-4 | 1.5 | 52.5 | 32.0 | 56.1 | 2.59 | + |
| | 4-5 | 2 | 51.8 | 33.3 | 56.5 | 2.60 | + |

Judgements "++", "+", "±" and "−" in the table are as described in Example 3. In addition, the average transmittance [(Tc+Ta)/2] was about 56%, and the effective Rag was about 0.4% for all samples. In addition, as shown in the table, it was confirmed that the effective Rcg was the value as designed (about 2.60%) in all samples.

As a result, Samples 4-1 to 4-5, that is, samples in which the thickness of the nucleation layer 38 was from 0.1 nm to 2 nm were judged as "+" or "++", and thus, exhibited good property. Especially, samples in which the thickness of the nucleation layer 38 was from 0.5 nm to 1 nm were judged as "++", and thus, exhibited excellent property.

It is considered that, when the thickness of the nucleation layer 38 was 0.1 nm, the nucleation layer 38 was formed in a shape of islands and had slight reduced nucleation ability, resulting in 3T erase rate of less than 30 dB. However, there is no practical problem as long as 3T erase rate is 25 dB or more. On the other hand, it is considered that, when the thickness of the nucleation layer 38 was from 1.5 nm to 2 nm, the crystallization ability was increased, and crystal particle diameter in the recording layer 35 was reduced, and the recording mark formed in the recording layer 35 became slightly smaller, resulting in CNR of less than 53 dB. However, there is no practical problem as long as CNR is 50 dB and more.

From the results of Example 2 and the present Example, it was found that the nucleation layer 38 of the third information layer 30 is preferably formed of a material represented by the formula (2) $(Ge_{0.5}Te_{0.5})_z(Bi_{0.4}Te_{0.6})_{100-z}$ (mol %) wherein z satisfies 10≤z≤71 and that the thickness of the nucleation layer 38 is preferably 0.1 nm or more and 2 nm or less.

EXAMPLE 5

In Example 5, the relationship of the thickness of the recording layer 35 to erasing characteristics, transmittance and reflectance was examined by use of the recording layer 35 represented by $[(Ge_{0.5}Te_{0.5})_{0.925}(In_{0.4}Te_{0.6})_{0.075}]_{99.5}Sb_{0.5}$ and the nucleation layer 38 represented by $(Ge_{0.5}Te_{0.5})_{29}(Bi_{0.4}Te_{0.6})_{71}$.

The present Example is specifically described below. First of all, a method for manufacturing the information recording medium 100 is described. The substrate 1, the first information layer 10, the intermediate layer 3, the second information layer 20 and the intermediate layer 4 were formed in the same way as those in the first experiment of Example 2.

A $Bi_2Ti_2O_7$ layer as the dielectric layer 31, an Ag—Pd—Cu alloy layer as the reflective layer 32, a $(ZrO_2)_{40}(SiO_2)_{40}(Cr_2O_3)_{20}$ layer as a dielectric layer 33, a $(ZrO_2)_{25}(SiO_2)_{25}(Cr_2O_3)_{50}$ layer having a thickness of 5 nm as an interface layer 34, a $(Ge_{0.5}Te_{0.5})_{29}(Bi_{0.4}Te_{0.6})_{71}$ as the nucleation layer 38, a $[(Ge_{0.5}Te_{0.5})_{0.925}(In_{0.4}Te_{0.6})_{0.075}]_{99.5}Sb_{0.5}$ layer as a recording layer 35, a $(ZrO_2)_{25}(SiO_2)_{25}(Cr_2O_3)_{50}$ layer having a thickness of 5 nm as an interface layer 36, a $(ZnS)_{80}(SiO_2)_{20}$ layer as a dielectric layer 37 were laminated in this order on the surface of the intermediate layer 4 the guide groove formed therein. The third information layer 30 was formed in this manner.

Samples 5-1 to 5-5 having different thicknesses of the recording layers 35 in the third information layers 30 were optically designed such that the average transmittance was 53% or more, the effective Rcg was 2.2% or more and 4.0% or less and the effective Rag was 0.3% or more and 0.6% or less. The thicknesses of the dielectric layer 31, the reflective layer 32, the dielectric layer 33, the nucleation layer 38 and the dielectric layer 37 were adjusted in accordance with the design. Thicknesses of these layers in each sample were as follows.

(Sample 5-1) The dielectric layer 31: 18 nm, the reflective layer 32: 12.2 nm, the dielectric layer 33: 7 nm, the nucleation layer 38: 0.8 nm, the recording layer 35: 3 nm, the dielectric layer 37: 40 nm.

(Sample 5-2) The dielectric layer 31: 18 nm, the reflective layer 32: 10.3 nm, the dielectric layer 33: 7 nm, the nucleation layer 38: 0.8 nm, the recording layer 35: 5 nm, the dielectric layer 37: 40 nm.

(Sample 5-3) The dielectric layer 31: 18 nm, the reflective layer 32: 6 nm, the dielectric layer 33: 7 nm, the nucleation layer 38: 0.8 nm, the recording layer 35: 7 nm, the dielectric layer 37: 40 nm.

(Sample 5-4) The dielectric layer 31: 20 nm, the reflective layer 32: 3 nm, the dielectric layer 33: 3 nm, the nucleation layer 38: 0.8 nm, the recording layer 35: 9 nm, the dielectric layer 37: 38 nm.

(Sample 5-5) The dielectric layer 31: 20 nm, the reflective layer 32: 3 nm, the dielectric layer 33: 3 nm, the nucleation layer 38: 0.1 nm, the recording layer 35: 10 nm, the dielectric layer 37: 38 nm.

Subsequently, the transparent layer 2 was formed in the same way as that in the first experiment of Example 2. Similarly, initialization was carried out after forming the transparent layer 2. Sputtering conditions for the respective layers were the same as those employed in the first experiment of Example 2.

The effective Rcg and the average transmittance of the third information layer 30 were determined according to the method described in Example 4. 3T CNR and 3T erase rate were evaluated according to the method described in Example 3 using a sample manufactured as the information recording medium having three-layered structure. The recording power was 12.7 mW to 14.0 mW, and the erasing power was 4.1 mW to 4.5 mW when 3T CNR and 3T erase rate were evaluated.

Relation of the thickness of the recording layer 35 to 3T CNR, 3T erase rate, average transmittance and reflectance of the third information layer 30 in the information recording medium 100 are shown in Table 5.

TABLE 5

| Sample Number | | Thickness of Recording Layer 35 (nm) | 3T CNR (dB) | 3T Erase Rate (dB) | Transmittance (%) | Reflectance (%) | Judgment |
|---|---|---|---|---|---|---|---|
| Example | 5-1 | 3 | 53.6 | 25.1 | 61.9 | 2.59 | + |
| | 5-2 | 5 | 53.2 | 30.5 | 57.0 | 2.62 | ++ |
| | 5-3 | 7 | 53.0 | 31.9 | 56.1 | 2.60 | ++ |
| | 5-4 | 9 | 52.5 | 33.4 | 54.9 | 3.39 | + |
| | 5-5 | 10 | 51.8 | 34.8 | 54.1 | 3.63 | + |

The meaning of the judgments "++", "+", "±" and "−" in the table is as described in Example 3. In addition, the average transmittance [(Tc+Ta)/2] was about 53% or more, the effective Rcg was 2.2% or more and 4.0% or less, the effective Rag was 0.3% or more and 0.6% or less.

As a result, Samples 5-1 to 5-5, that is, samples in which the thicknesses of the recording layers 35 were from 3 nm to 10 nm were judged as "+" or "++", and thus, exhibited good property. Samples in which the thicknesses of the recording layers 35 were from 5 nm to 7 nm were judged as "++", and thus, exhibited excellent property.

It is considered that, when the thickness of the recording layer 35 was 3 nm, the crystallization ability of the recording layer 35 was slightly reduced resulting in 3T erase rate of less than 30 dB. However, there is no practical problem when 3T erase rate is 25 dB or more. On the other hand, it is considered that, when the thickness of the recording layer 35 was 9 nm or more, the crystallization ability of the recording layer 35 was enhanced and the recording mark formed on the recording layer 35 became slightly smaller, resulting in CNR of less than 53 dB. However, there is no practical problem when CNR is 50 dB or more.

It is found from the results of Example 1, Example 3 and the present Example that the recording layer 35 of the third information layer 30 preferably consists of a material represented by $[(Ge_{0.5}Te_{0.5})_x(In_{0.4}Te_{0.6})_{1-x}]_y Sb_{100-y}$ (mol %) wherein x satisfies 0.8≤x<1.0, y satisfies 95≤y<100 and that the thickness is preferably from 3 nm to 10 nm.

EXAMPLE 6

In Example 6, archival characteristics, of the first information layer 10, the second information layer 20 and the third information layer 30, that is, stability of the recording mark was evaluated.

The present example is specifically described below. First of all, the method for manufacturing the information recording medium 100 is described. In the present example, information recording media 100 which have configuration similar to that of Sample 2-3 in Example 2 were manufactured. Compositions and thicknesses of the nucleation layers 18, 28 and 38 and the recording layers 15, and 35 used in the present example are as follows.

Sample 6-1: In the first information layer 10, the nucleation layer 18 was a $(Ge_{0.5}Te_{0.5})_{29}(Bi_{0.4}Te_{0.6})_{71}$ layer having a thickness of 1 nm, and the recording layer 15 was a $[(Ge_{0.5}Te_{0.5})_{0.9}(In_{0.4}Te_{0.6})_{0.1}]_{99.5}Sb_{0.5}$ layer having a thickness of 10 nm; in the second information layer 20, the nucleation layer 28 was a $(Ge_{0.5}Te_{0.5})_{29}(Bi_{0.4}Te_{0.6})_{71}$ layer having a thickness of 0.8 nm, and the recording layer 25 was a $[(Ge_{0.5}Te_{0.5})_{0.925}(In_{0.4}Te_{0.6})_{0.075}]_{99.5}Sb_{0.5}$ layer having a thickness of 7 nm; in the third information layer 30, the nucleation layer 38 was a $(Ge_{0.5}Te_{0.5})_{29}(Bi_{0.4}Te_{0.6})_{71}$ layer having a thickness of 0.8 nm, and the recording layer 35 was a $[(Ge_{0.5}Te_{0.5})_{0.925}(In_{0.4}Te_{0.6})_{0.075}]_{99.5}Sb_{0.5}$ layer having a thickness of 6 nm.

Sample 6-2: In the first information layer 10, the nucleation layer 18 was a $(Ge_{0.5}Te_{0.5})_{29}(Bi_{0.4}Te_{0.6})_{71}$ layer having a thickness of 1 nm, and the recording layer 15 was a $[(Ge_{0.5}Te_{0.5})_{0.925}(In_{0.4}Te_{0.6})_{0.075}]_{98.5}Sb_{1.5}$ layer having a thickness of 10 nm; in the second information layer 20, the nucleation layer 28 was a $(Ge_{0.5}Te_{0.5})_{29}(Bi_{0.4}Te_{0.6})_{71}$ layer having a thickness of 0.8 nm, and the recording layer 25 was a $[(Ge_{0.5}Te_{0.5})_{0.95}(In_{0.4}Te_{0.6})_{0.05}]_{98.5}Sb_{1.5}$ layer having a thickness of 7 nm; in the third information layer 30, the nucleation layer 38 was a $(Ge_{0.5}Te_{0.5})_{29}(Bi_{0.04}Te_{0.6})_{71}$ layer having a thickness of 0.8 nm, and the recording layer 35 was a $[(Ge_{0.5}Te_{0.5})_{0.95}(In_{0.4}Te_{0.6})_{0.05}]_{98.5}Sb_{1.5}$ layer having a thickness of 6 nm.

Sample D-1: In the first information layer 10, the nucleation layer 18 was not provided, and the recording layer 15 was a $(Ge_{0.5}Te_{0.5})_{0.9}(Sb_{0.4}Te_{0.6})_{0.1}$ layer having a thickness of 10 nm; in the second information layer 20, the nucleation layer 28 was not provided, and the recording layer 25 was a $(Ge_{0.5}Te_{0.5})_{0.925}(Sb_{0.4}Te_{0.6})_{0.075}$ layer having a thickness of 7 nm; in the third information layer 30, the nucleation layer 38 was not provided, the recording layer 35 was a $(Ge_{0.5}Te_{0.5})_{0.925}(Sb_{0.4}Te_{0.6})_{0.075}$ layer having a thickness of 6 nm.

Sample D-2: In the first information layer 10, the nucleation layer 18 was not provided, and the recording layer 15 was a $(Ge_{0.5}Te_{0.5})_{0.9}(Bi_{0.4}Te_{0.6})_{0.1}$ layer having a thickness of 10 nm; in the second information layer 20, the nucleation layer 28 was not provided, and the recording layer 25 was a $(Ge_{0.5}Te_{0.5})_{0.925}(Bi_{0.4}Te_{0.6})_{0.075}$ layer having a thickness of 7 nm; in the third information layer 30, the nucleation layer 38 was not provided, and the recording layer 35 was a $(Ge_{0.5}Te_{0.5})_{0.925}(Bi_{0.4}Te_{0.6})_{0.075}$ layer having a thickness of 6 nm.

Next, the evaluation of the archival characteristics is described. The evaluation of the archival characteristics was carried out in order to examine whether or not a mark recorded was maintained even in a high temperature condition. The evaluation was carried out using an apparatus for the recording and reproduction evaluation having the same optical system as that used in Example 2. Specific method for the evaluation is as follows. In accordance with the method for measuring CNR described in Example 2, amplitude (C1), noise (N1) and CNR1 (dB) of the eleventh 3T signal were previously measured. These medium were left for 100 hours in a high-temperature and high-humidity vessel with an inside temperature of 80° C. and a relative humidity of 85% followed by dehumidification and then, taken out at room temperature. After taking out, 3T signal recorded was reproduced, and an amplitude (C2), noise (N2) and CNR (dB) were measured again. Difference between the amplitudes before and after leaving in the high-temperature and high-humidity vessel $\Delta C = C2 - C1$ (dB) was calculated, and superiority and inferiority in archival characteristics were examined.

In this way, archival characteristics of the first information layer 10, the second information layer 20 and the third information layer 30 were evaluated for the respective Samples 6-1, 6-2, D-1 and D-2. Recording and erasing powers when 3T CNR and 3T erase rate were evaluated were as follows:

(The first information layer 10) Recording power: about 25 mW, erasing power: about 10 mW, (The second information layer 20) Recording power: about 21 mW, erasing power: about 7 mW, (The third information layer 30) Recording power: about 13 mW, erasing power: about 4 mW.

In Samples 6-1 and 6-2, Rcg was about 24%, Rag was about 3%, the effective Rcg was about 1.9% and the effective Rag was about 0.2% for the first information layer 10; Rcg was about 6%, Rag was about 0.7%, the effective Rcg was about 1.9% and the effective Rag was about 0.2% for the second information layer 20; Rcg (effective Rcg) was about 2.6% and Rag (effective Rag) was about 0.4% for the third information layer 30.

It can be judged that there is the reduction in amplitude when $\Delta C < 0$ and that there is no reduction in amplitude when $0 \leq \Delta C$. The reduction in amplitude is a phenomenon suggesting that the recording mark in amorphous state becomes smaller because it was left under high-temperature and high-humidity environment. Although the recording mark is allowed to become smaller to some degree, the reduction in size of the recording mark means that the stability of the recording mark is relatively low. It can be judged that, when the reduction in amplitude is not observed, the mark recorded in the information layer does not become smaller even if it is left under high temperature and high humidity environment, which means the information layer is superior in stability of the recording mark.

The results of the stability evaluation of the recording marks in the first information layer 10, the second information layer 20 and the third information layer 30 are shown in Table 6.

TABLE 6

| Sample Number | | Recording Layer | Recording Layer Composition (mol %) $[(Ge_{0.5}Te_{0.5})_x(In_{0.4}Te_{0.6})_{1-x}]_y Sb_{100-y}$ | Stability of Recording Mark ΔC (dB) | Judgment |
|---|---|---|---|---|---|
| Example | 6-1 | Recording Layer 15 | $[(Ge_{0.5}Te_{0.5})_{0.9}(In_{0.4}Te_{0.6})_{0.1}]_{99.5}Sb_{0.5}$ | −0.3 | ++ |
| | | Recording Layer 25 | $[(Ge_{0.5}Te_{0.5})_{0.925}(In_{0.4}Te_{0.6})_{0.075}]_{99.5}Sb_{0.5}$ | +0.1 | ++ |
| | | Recording Layer 35 | $[(Ge_{0.5}Te_{0.5})_{0.925}(In_{0.4}Te_{0.6})_{0.075}]_{99.5}Sb_{0.5}$ | 0.0 | ++ |
| | 6-2 | Recording Layer 15 | $[(Ge_{0.5}Te_{0.5})_{0.925}(In_{0.4}Te_{0.6})_{0.075}]_{98.5}Sb_{1.5}$ | −0.2 | ++ |
| | | Recording Layer 25 | $[(Ge_{0.5}Te_{0.5})_{0.95}(In_{0.4}Te_{0.6})_{0.05}]_{98.5}Sb_{1.5}$ | +0.2 | ++ |
| | | Recording Layer 35 | $[(Ge_{0.5}Te_{0.5})_{0.95}(In_{0.4}Te_{0.6})_{0.05}]_{98.5}Sb_{1.5}$ | 0.0 | ++ |
| Comparative Example | D-1 | Recording Layer 15 | $(Ge_{0.5}Te_{0.5})_{0.9}(Sb_{0.4}Te_{0.6})_{0.1}$ | −4.2 | ± |
| | | Recording Layer 25 | $(Ge_{0.5}Te_{0.5})_{0.925}(Sb_{0.4}Te_{0.6})_{0.075}$ | −2.7 | + |
| | | Recording Layer 35 | $(Ge_{0.5}Te_{0.5})_{0.925}(Sb_{0.4}Te_{0.6})_{0.075}$ | −1.5 | + |
| | D-2 | Recording Layer 15 | $(Ge_{0.5}Te_{0.5})_{0.9}(Bi_{0.4}Te_{0.6})_{0.1}$ | −8.0 | − |
| | | Recording Layer 25 | $(Ge_{0.5}Te_{0.5})_{0.925}(Bi_{0.4}Te_{0.6})_{0.075}$ | −6.1 | − |
| | | Recording Layer 35 | $(Ge_{0.5}Te_{0.5})_{0.925}(Bi_{0.4}Te_{0.6})_{0.075}$ | −3.9 | ± |

Judgments "++", "+", "±" and "−" for the stability of the recording mark ΔC in the table are described. "++" indicates −0.5≤ΔC, "+" indicates −3≤ΔC<−0.5, "±" indicates −5≤ΔC<−3, "−" indicates ΔC<−5. In the case of −0.5≤ΔC, amplitude is not reduced when being left under high temperature and high humidity environment even considering measurement variation due to the apparatus for the recording and reproduction evaluation, and thus, an information layer exhibiting excellent stability of the recording mark can be obtained which is expected to have a storage life of 30 years or more at room temperature. In the case of −3≤ΔC<−0.5, an information layer exhibiting good stability of the recording mark can be obtained which is expected to have storage life of 10 years or more at room temperature. In the case of −5≤ΔC<−3, the storage life of the information layer is likely to be less than 10 years at room temperature. Considering a practical use, the storage life is preferably 10 years or more at room temperature. In the case of ΔC<−5, the storage life of the information layer is more likely to be less than one year at room temperature, and the information layer cannot be practically used.

As a result, in Samples 6-1 and 6-2, judgment "++" was made when the recording layers 15, 25 and 35 and the nucleation layers 18, 28 and 38 were formed in the first information layer 10, the second information layer 20 and the third information layer 30, and the compositions of the recording layer and the nucleation layer were represented by the formulas (1) and (2), and thus, excellent stability of the recording mark was obtained. Therefore, Samples 6-1 and 6-2 is of practical use as an information recording medium with a capacity of 100 GB.

In contrast, the first information layer 10 was judged as "±" in Sample D-1 in which the recording layers 15, 25 and 35 were formed of $Ge_{0.5}Te_{0.5}$—$Sb_{0.4}Te_{0.6}$-based material. Although the second information layer 20 and the third information layer 30 were judged as "+", Sample D-1 is impractical as the information recording medium including three information layers with a capacity of 100 GB.

In Sample D-2 in which the recording layers 15, 25 and 35 were formed of $Ge_{0.5}Te_{0.5}$—$Bi_{0.4}Te_{0.6}$-based material, the first information layer 10 and the second information layer 20 were judged as "−". The third information layer 30 was judged as "+". The first to third information layers in Sample D-2 had reduced stability of the recording mark compared to the first to third information layers in Sample D-1, respectively. Therefore, Sample D-2 is impractical as the information recording medium with a capacity of 100 GB.

From the results of the present example, it was found that stability of the recording mark was insufficient when GeTe—$Sb_2Te_3$-based material was applied to the recording layer of the information recording medium having a capacity of 33.4 GB per one information layer and of 100 GB with three layers. Similarly, from the results of Example 1 and the present example, it was found that optical change was reduced and stability of the recording mark was insufficient when GeTe—$Bi_2Te_3$-based material was applied to the recording layer of the information recording medium having a capacity of 33.4 GB per one information layer and of 100 GB with three layers.

In the information recording medium having a capacity of 33.4 GB per one information layer and 100 GB with three layers, sufficient signal amplitude from signals recorded in the respective information layers is obtained, the recording mark is stored stably and thus, high reliability is also obtained by applying a material represented by the formula (1) $[(Ge_{0.5}Te_{0.5})_x(In_{0.4}Te_{0.6})_{1-x}]_y Sb_{100-y}$ to the recording layer and applying a material represented by the formula (2) $(Ge_{0.5}Te_{0.5})_z(Bi_{0.4}Te_{0.6})_{100-z}$ to the nucleation layer. In addition, translucent information layer exhibiting high transmittance can be achieved by use of these materials. As a result, a multi-layered information recording medium having a capacity of 100 GB or more was able to be provided.

As described through various examples described above, the recording layer having a composition represented by the formula (1) $[(Ge_{0.5}Te_{0.5})_x(In_{0.4}Te_{0.6})_{1-x}]_y Sb_{100-y}$ wherein x satisfies 0.8≤x<1.0 and y satisfies 95≤y<100 had large optical change and high crystallization temperature. The crystal particle diameter in the recording layer was able to be decreased and thus, the noise was able to be reduced by providing, in contact with the recording layer, the nucleation layer having a composition represented by the formula (2) $(Ge_{0.5}Te_{0.5})_z(Bi_{0.4}Te_{0.6})_{100-z}$ wherein z satisfies $10 \leq z \leq 71$. The translucent information layer exhibiting sufficient signal amplitude and high transmittance as well as high reliability allowing the recording mark to be stored stably was able to be provided by applying these recording layer and nucleation layer. Further, the achievement of this translucent information layer was able to give the large-capacity recording medium of 100 GB.

INDUSTRIAL APPLICABILITY

The information recording medium of the present invention is useful for rewritable multi-layered Blu-ray Disc as large-capacity optical information recording medium. In addition, the information recording medium of the present invention is also useful as a large-capacity optical information recording medium such as a next-generation information recording medium or a next-generation rewritable multi-layered information recording medium in which recording and reproduction are carried out by an optical system of NA>1, for example, an optical system using SIL and SIM.

DESCRIPTION OF REFERENCE NUMERAL

1: Substrate
2: Transparent layer
3, 4: Intermediate layer
5: Laser beam
10, 20, 30: Information layer
11, 13, 17, 21, 23, 27, 31, 33, 37: Dielectric layer
12, 22, 32: Reflective layer
14, 16, 24, 26, 34, 36: Interface layer
15, 25, 35: Recording layer
18, 28, 38: Nucleation layer
100: Information recording medium

The invention claimed is:

1. An information recording medium comprising three or more information layers and being capable of recording and reproducing information by light, wherein at least one information layer comprises a recording layer and a nucleation layer;
the recording layer comprises a material represented by a following formula (1):

$$[(Ge_{0.5}Te_{0.5})_x(In_{0.4}Te_{0.6})_{1-x}]_y Sb_{100-y}(\text{mol \%}) \quad (1)$$

wherein x satisfies $0.8 \leq x < 1.0$ and y satisfies $95 \leq y < 100$;
the nucleation layer comprises a material represented by a following formula (2):

$$(Ge_{0.5}Te_{0.5})_z(Bi_{0.4}Te_{0.6})_{100-z}(\text{mol \%}) \quad (2)$$

wherein z satisfies $10 \leq z \leq 71$; and
the nucleation layer is in contact with the recording layer.

2. The information recording medium according to claim 1, wherein an average crystal particle diameter of crystal particles constituting the recording layer is less than 100 nm.

3. The information recording medium according to claim 1, wherein at least one of the information layers provided on a light incident side comprises the recording layer and the nucleation layer.

4. The information recording medium according to claim 1, wherein all the information layers on a light incident side comprise the recording layer and the nucleation layer.

5. The information recording medium according to claim 1, wherein all the information layers comprise the recording layer and the nucleation layer.

6. The information recording medium according to claim 1, wherein the nucleation layer has a thickness of 0.1 nm or more and 2.0 nm or less.

7. The information recording medium according to claim 1, wherein the recording layer has a thickness of 3 nm or more and 10 nm or less.

8. A method for manufacturing an information recording medium comprising three or more information layers and being capable of recording and reproducing information by light, which comprises three or more steps of forming the information layer,
wherein a step of forming at least one information layer comprises a step of forming a recording layer and a step of forming a nucleation layer;
the step of forming the recording layer comprises sputtering by use of a target comprising Ge, In, Te and Sb so as to form a recording layer comprising a material represented by a following formula (1):

$$[(Ge_{0.5}Te_{0.5})_x(In_{0.4}Te_{0.6})_{1-x}]_y Sb_{100-y}(\text{mol \%}) \quad (1)$$

wherein x satisfies $0.8 \leq x < 1.0$ and y satisfies $95 \leq y < 100$;
the step of forming the nucleation layer comprises sputtering by use of a target comprising Ge, Bi and Te so as to form a nucleation layer comprising a material represented by a following formula (2):

$$(Ge_{0.5}Te_{0.5})_z(Bi_{0.4}Te_{0.6})_{100-z}(\text{mol \%}) \quad (2)$$

wherein z satisfies $10 \leq z \leq 71$; and
the step of forming the nucleation layer is carried out just before or just after the step of forming the recording layer, or just before and just after the step of forming the recording layer.

* * * * *